US012759757B2

(12) United States Patent
Christopher et al.

(10) Patent No.: US 12,759,757 B2
(45) Date of Patent: Oct. 13, 2026

(54) SYSTEM AND METHOD FOR SECURING CONTAINERS

(71) Applicant: Home Depot Product Authority, LLC, Atlanta, GA (US)

(72) Inventors: Brent Christopher, Centennial, CO (US); Kenneth Freeman, Centennial, CO (US)

(73) Assignee: Home Depot Product Authority, LLC, Atlanta, GA (US)

( * ) Notice: Subject to any disclaimer, the term of this patent is extended or adjusted under 35 U.S.C. 154(b) by 439 days.

(21) Appl. No.: 18/079,196

(22) Filed: Dec. 12, 2022

(65) Prior Publication Data

US 2024/0190612 A1 Jun. 13, 2024

(51) Int. Cl.
*B65D 21/032* (2006.01)
*B62B 1/04* (2006.01)
*B65D 21/02* (2006.01)

(52) U.S. Cl.
CPC ............ *B65D 21/0228* (2013.01); *B62B 1/04* (2013.01); *B65D 21/023* (2013.01); *B65D 2255/20* (2013.01)

(58) Field of Classification Search
CPC ........................... B65D 21/02; B65D 21/0223; B65D 21/0222; B65D 21/0204; B65D 21/0201; B65D 21/0209; B65D 21/0228; B65D 2501/24675; Y10T 403/608; Y10T 403/595
USPC .............. 206/503, 506, 1.5; 403/322.4, 330; 220/4.27
See application file for complete search history.

(56) References Cited

U.S. PATENT DOCUMENTS 3,648,849 A 3/1972 Harris
4,619,363 A 10/1986 Wolfseder
5,011,013 A 4/1991 Mesiner et al.
6,193,062 B1 2/2001 Rysgaard et al.
(Continued)

FOREIGN PATENT DOCUMENTS

CN 203427004 2/2014
CN 206841966 1/2018
(Continued)

OTHER PUBLICATIONS

International Search Report and Written Opinion of application No. PCT/US23/78952, mailed Apr. 17, 2024, 13 pp.
(Continued)

*Primary Examiner* — Allan D Stevens
(74) *Attorney, Agent, or Firm* — Greenberg Traurig, LLP

(57) ABSTRACT

A system for securing a first container to a second container includes an upper locking portion and a lower locking portion. A first protrusion of the upper locking portion abuts the second container and restricts movement of the second container in the locked position. A surface of a second body of the lower locking portion is configured to receive a force and to cause the lower locking portion to rotate about a second pivot to an unlocked position. The rotation of the lower locking portion to the unlocked position causes a second protrusion of the upper locking portion to abut a first body of the upper locking portion and cause the upper locking portion to rotate to an unlocked position. The rotation of the upper locking portion to the unlocked position causes the first protrusion to disengage from the second container.

11 Claims, 20 Drawing Sheets

(56) References Cited

U.S. PATENT DOCUMENTS

| | | | | |
|---|---|---|---|---|
| 6,371,320 | B2 | 4/2002 | Sagol | |
| 6,761,366 | B1 | 7/2004 | Klemmensen et al. | |
| 6,889,838 | B2 | 5/2005 | Meier et al. | |
| D630,435 | S | 1/2011 | Brunner | |
| 8,567,796 | B2 | 10/2013 | Bar-Erez et al. | |
| 8,602,217 | B2 | 12/2013 | Sosnovsky et al. | |
| 8,936,258 | B2 | 1/2015 | Bar-Erez et al. | |
| 9,132,543 | B2 | 9/2015 | Bar-Erez et al. | |
| 9,277,796 | B1 | 3/2016 | Elam | |
| 9,393,684 | B2 | 7/2016 | Christopher et al. | |
| 9,566,990 | B2 | 2/2017 | Bar-Erez et al. | |
| 9,643,629 | B2 | 5/2017 | Bar-Erez et al. | |
| 10,106,180 | B2 | 10/2018 | Bar-Erez et al. | |
| 10,434,638 | B1 | 10/2019 | Tsai | |
| 10,583,962 | B2 | 3/2020 | Brunner et al. | |
| 10,703,534 | B2 | 7/2020 | Brunner et al. | |
| 10,793,172 | B2 | 10/2020 | Brunner | |
| 10,981,696 | B2 | 4/2021 | Brunner et al. | |
| 11,008,136 | B2 | 5/2021 | Brunner et al. | |
| 11,027,883 | B1 | 6/2021 | Brunner et al. | |
| 11,059,631 | B1 | 7/2021 | Brunner et al. | |
| 11,066,089 | B2 | 7/2021 | Brunner | |
| 11,155,382 | B1 | 10/2021 | Cai | |
| 11,192,689 | B2 | 12/2021 | Cai | |
| 11,192,690 | B1 | 12/2021 | Brunner et al. | |
| 11,459,008 | B2 | 10/2022 | Brunner et al. | |
| 2003/0062365 | A1 | 4/2003 | Krueger | |
| 2003/0094392 | A1 | 5/2003 | Maier et al. | |
| 2008/0121547 | A1 | 5/2008 | Dur et al. | |
| 2010/0224527 | A1 | 9/2010 | Huang | |
| 2011/0049824 | A1 | 3/2011 | Bar-Erez et al. | |
| 2011/0139777 | A1 | 6/2011 | Sosnovsky et al. | |
| 2011/0155613 | A1 | 6/2011 | Koenig et al. | |
| 2011/0168599 | A1 | 7/2011 | Koenig et al. | |
| 2012/0312812 | A1 | 12/2012 | Sosnovsky et al. | |
| 2012/0326406 | A1 | 12/2012 | Lifshitz et al. | |
| 2015/0274362 | A1* | 10/2015 | Christopher | B65D 21/0219 206/506 |
| 2016/0144500 | A1 | 5/2016 | Chen | |
| 2016/0236592 | A1 | 8/2016 | Peniche et al. | |
| 2017/0121056 | A1 | 5/2017 | Wang | |
| 2017/0151972 | A1 | 6/2017 | Bar-Erez et al. | |
| 2018/0220758 | A1 | 8/2018 | Burchia | |
| 2019/0002004 | A1 | 1/2019 | Brunner | |
| 2019/0308772 | A1 | 10/2019 | Gonitianer et al. | |
| 2019/0315515 | A1 | 10/2019 | Gonitianer et al. | |
| 2020/0025229 | A1 | 1/2020 | Baruch et al. | |
| 2020/0298392 | A1* | 9/2020 | Baruch | B25H 3/02 |
| 2020/0346819 | A1 | 11/2020 | Kogel et al. | |
| 2022/0177191 | A1* | 6/2022 | Brunner | A45C 5/14 |
| 2022/0242613 | A1* | 8/2022 | Holzleithner | B65D 25/107 |
| 2023/0136626 | A1* | 5/2023 | Cai | B25H 3/02 206/503 |

FOREIGN PATENT DOCUMENTS

| | | |
|---|---|---|
| CN | 115401664 A | 11/2022 |
| DE | 202013003741 | 4/2013 |
| DE | 20201506823 | 3/2017 |
| DE | 102015013053 | 4/2017 |
| EP | 0555533 | 8/1993 |
| EP | 1059240 | 12/2000 |
| EP | 1238602 | 9/2002 |
| EP | 1516703 | 3/2005 |
| EP | 2402259 | 1/2012 |
| JP | 2005162223 | 6/2005 |
| WO | 2011135559 | 11/2011 |
| WO | 2019105598 | 6/2019 |

OTHER PUBLICATIONS

Boschtools.com “L-boxx” products, Model #: L-BOXX-1, L-BOXX-2, L-BOXX-3, L-BOXX-4, http://www.boschtools.com/Products/Tools/Pages/Item Results.aspx?catid=1 611, Date unknown but prior to U.S. filing date.

Festoolproducts.com “T-Loc” products, Model #: SYS 1, SYS 2, SYS 3, SYS 4, SYS 5, http://www.festoolproducts.com/Systainer-Storage-System-s/75.htm, Date unknown but prior to U.S. filing date.

Dewalt ToughSystem 2.0 Toolbox, DWST08165, https://www.dewalt.com/product/dwst08165/toughsystemr-20-toolbox?tid=576956, Screen print of webpage printed Sep. 13, 2022. Original date unknown but prior to U.S. filing date.

Dewalt ToughSystem 2.0 Full-Size Organizer, DWST08040, https://www.dewalt.com/product/dwst08040/toughsystemr-20-full-size-organizer, Screen print of webpage printed Sep. 13, 2022. Original date unknown but prior to U.S. filing date.

* cited by examiner

SYSTEM AND METHOD FOR SECURING CONTAINERS

TECHNICAL FIELD

This disclosure generally relates to a system for interlocking multiple storage containers.

BACKGROUND

Tool storage systems are commonly used by businesses and consumers to store and organize tools, spare parts, fasteners, and the like. Tool storage systems range from single cabinets with one storage receptacle to systems with multiple cabinets, each with multiple storage receptacles configured to meet a variety of needs.

SUMMARY

In one embodiment, A system for securing a first container to a second container, the system includes an upper locking portion and a lower locking portion. The upper locking portion includes a first body having a first protrusion extending laterally from the first body towards a relative center of the first container; a first pivot structured to interface with a recess of the first container; and a first resilient member configured to bias the upper locking portion in a locked position. The lower locking portion includes a second body having a surface and a second protrusion extending substantially parallel to a side of the second container; a second pivot structured to pivotably couple the second body to the second container; and a second resilient member configured to bias the lower locking portion in a locked position. The first protrusion abuts the second container and restricts movement of the second container in the locked position, the surface of the second body is configured to receive a force and to cause the lower locking portion to rotate about the second pivot to an unlocked position, the rotation of the lower locking portion to the unlocked position causes the second protrusion to abut the first body and cause the upper locking portion to rotate to an unlocked position, and the rotation of the upper locking portion to the unlocked position causes the first protrusion to disengage from the second container.

In one embodiment, a method for securing a first container having an upper locking portion to a second container having a lower locking portion includes causing the upper locking portion to pivot from a locked position to an unlocked position; positioning a relative bottom of the second container substantially flush with a relative top of the first container; causing the upper locking portion to pivot to locked position; and applying a force to the lower locking portion to cause the lower locking portion to pivot from a locked position to an unlocked position, the force substantially perpendicular to and extending away from a plane defined by the substantially flush position of the first and second containers. In the locked position, the upper locking portion secures the second container to the first container, in the unlocked position, the upper locking portion does not interface with the second container, and the pivoting of the lower locking portion causes the lower locking portion to interface with the upper locking portion and to force the upper locking portion to pivot from the locked position to the unlocked position.

In one embodiment, a first container includes a first upper portion having an upper locking portion including a first pivot structured to interface with a container; and a first lower portion having a lower locking portion including a second pivot structured to interface with the container. The first pivot is sized and shaped to interface with a second lower portion of a second container, and the second pivot is sized and shaped to interface with a second upper portion of the second container

BRIEF DESCRIPTION OF THE DRAWINGS

FIG. 1 *b* is a perspective view of a second container having a system for interlocking containers.

FIG. 1 *c* is a perspective view of a third container having a system for interlocking containers.

FIG. 1 *d* is a perspective view of the first, second, and third containers of FIGS. 1 *a-c*.

FIG. 2 *b* is a side perspective view of the upper locking portion of FIG. 2 *a*.

FIG. 2 *c* is a rear perspective view of the upper locking portion of FIG. 2 *a*.

FIG. 2 *d* is a rear view of the upper locking portion of FIG. 2 *a*.

FIG. 3 *b* is a front cross-sectional view of the upper locking portion of FIG. 2 *a*, taken along line 3*b*-3*b* in FIG. 2*b*.

FIG. 3 *c* is a side perspective view of the upper locking portion of FIG. 2 *a*.

FIG. 3 *d* is a front perspective view of the upper locking portion of FIG. 2 *a*.

FIG. 4 *b* is a bottom perspective view of the lower locking portion of FIG. 4 *a*.

FIG. 4 *c* is a front perspective view of the lower locking portion of FIG. 4 *a*.

FIG. 6 *b* is a side cross-sectional view of an interaction between the upper locking portion of FIG. 1 *a* and the lower locking portion of FIG. 4 *a*, taken along line 6*b*-6*b* in FIG. 1*d*.

FIG. 7 *b* is a perspective view of the system for interlocking containers of FIG. 7 *b*.

DETAILED DESCRIPTION

The following disclosure of example systems and methods is not intended to limit the scope of the detailed description to the precise form or forms detailed herein. Instead, the following disclosure is intended to be illustrative so that others may follow its teachings.

Described herein are systems and methods for securing containers. The system may include, for example, a rotatable upper locking portion positioned on a relative top (or upper portion) of a container and a rotatable lower locking portion on a relative bottom (or lower portion) of the same container. The locking portions may interface with locking portions of another container (e.g., the upper locking portion of one container with the lower locking portion of another). Because both the upper locking portion and lower locking portion rotate about respective axes, the system is simultaneously more secure (e.g., due to multiple points of connection) and more ergonomic. For example, because rotation of the lower locking portion is sufficient to release the system and is also aligned with the action of picking up a container, a user is able to de-couple containers in a single motion.

Figure 1A:
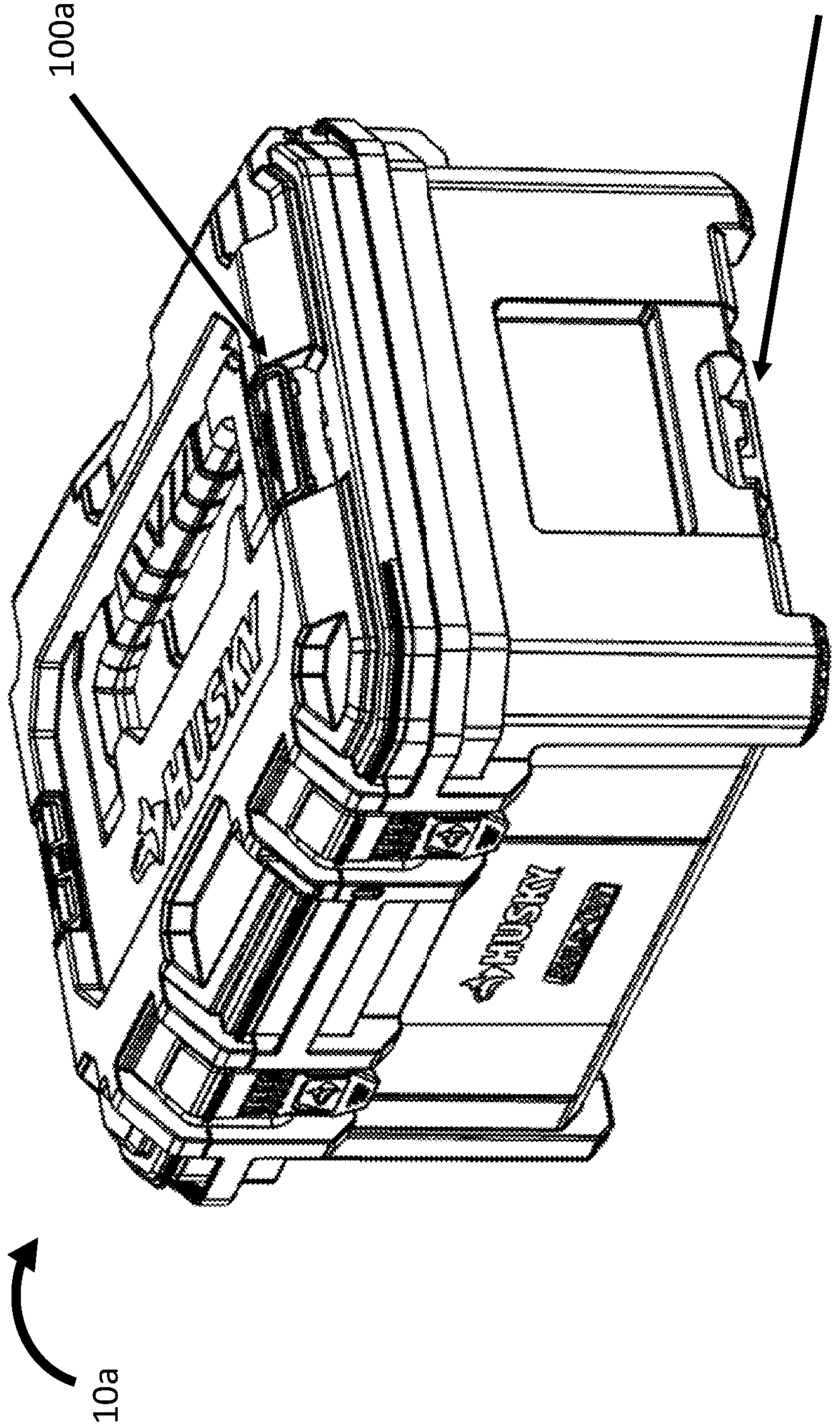
FIG. 1 *a* is a perspective view of a first container having a system for interlocking containers.

Referring to the drawings, wherein like numerals refer to the same or similar features in the various views, FIG. 1*a* is a perspective view of a first container having a system for interlocking containers, in accordance with various embodiments of the present disclosure. As shown in FIG. 1*a*, a first container 10*a* may include an upper portion having a first upper locking portion 100*a* and a lower portion having a first lower locking portion 200*a*. The upper portion (and, consequently, the first upper locking portion 100*a*) is located at a top (relative to the orientation shown in FIG. 1*a*) of the first container 10*a* and the lower portion (and, consequently, the first lower locking portion 200*a*) is located at a bottom (relative to the orientation shown in FIG. 1*a*) of the first container 10*a*.

Figure 1B:
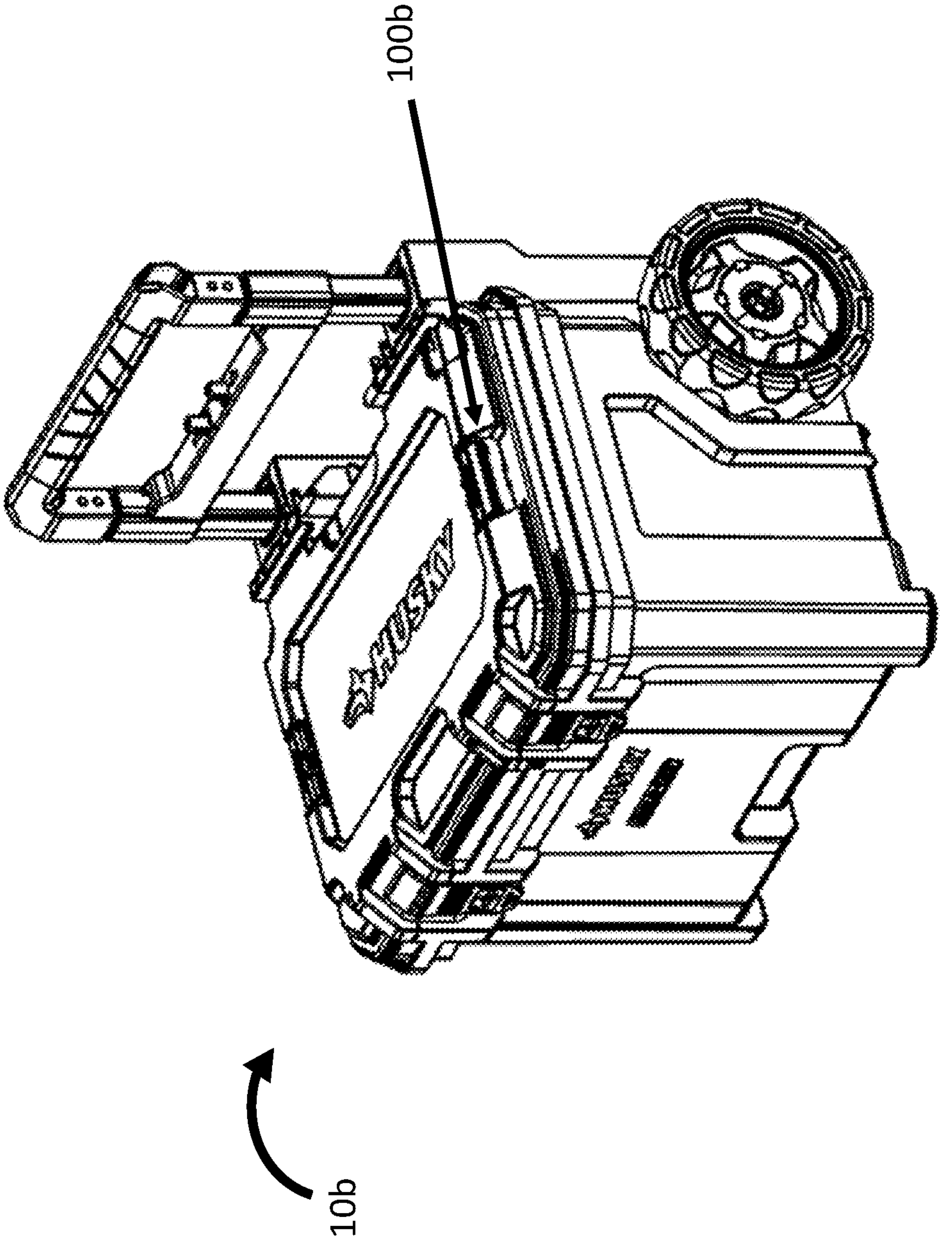

FIG. 1*b* is a perspective view of a second container having a system for interlocking containers, in accordance with various embodiments of the present disclosure. As shown in FIG. 1*b*, a second container 10*b* may include a second upper locking portion 100*b*.

Figure 1C:
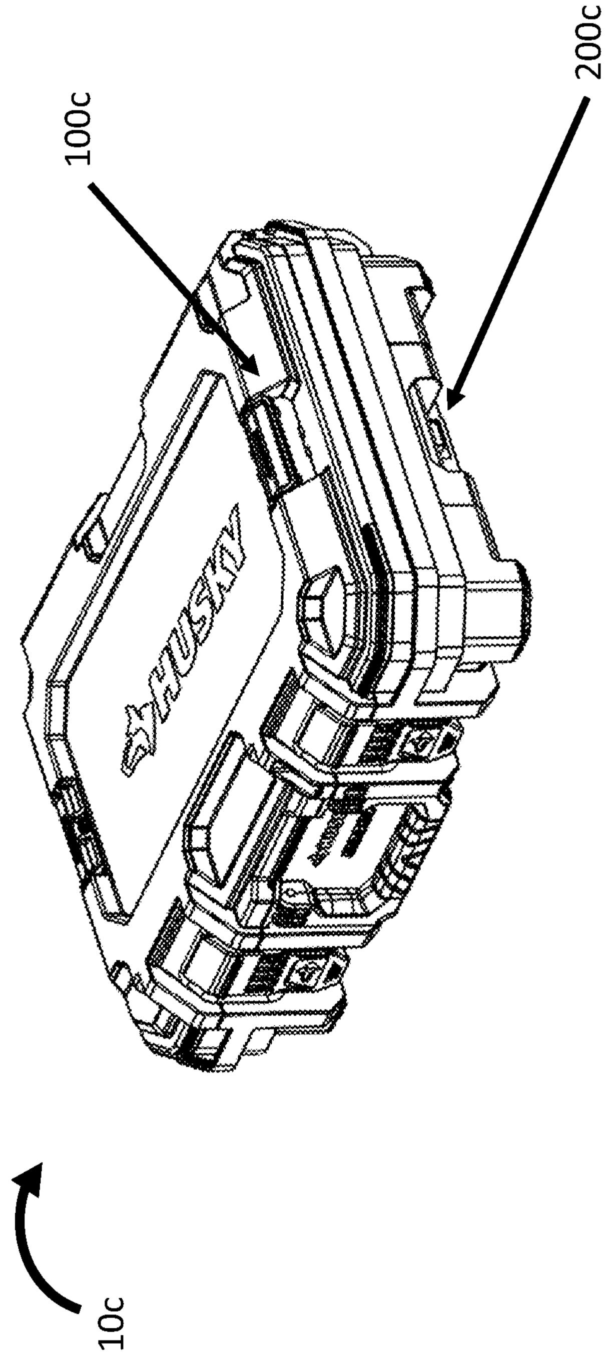

FIG. 1*c* is a perspective view of a third container having a system for interlocking containers, in accordance with various embodiments of the present disclosure. As shown in FIG. 1*c*, a third container 10*c* may include a third upper locking portion 100*c* and a third lower locking portion 200*c*.

Figure 1D:
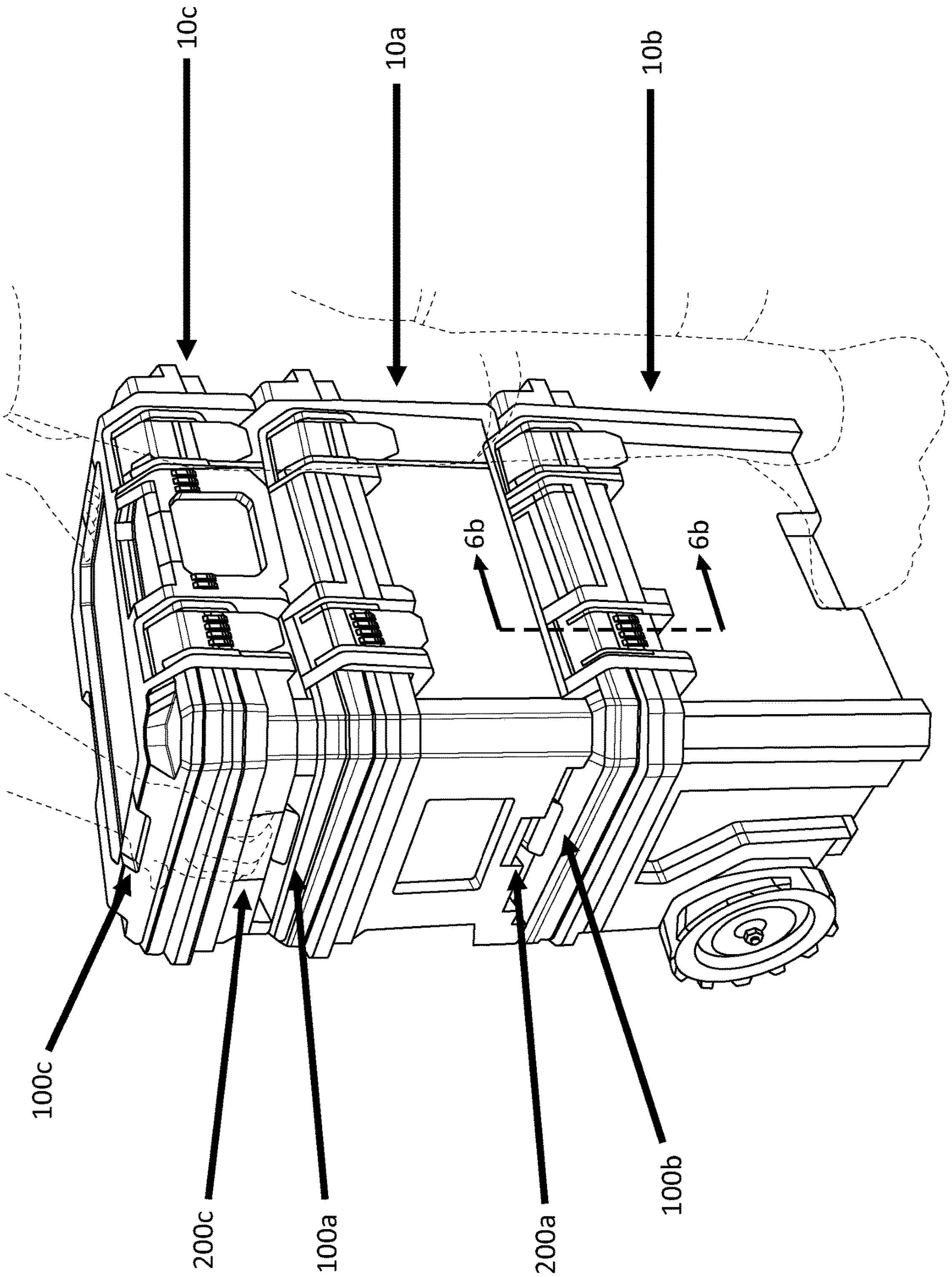

FIG. 1*d* is a perspective view of the first, second, and third containers of FIGS. 1*a*-*c*, in accordance with various embodiments of the present disclosure.

As shown in FIGS. 1*a*-1*d*, upper locking portions 100*a*, 100*b*, and 100*c* are similar and may be collectively referred to as upper locking portion(s) 100. Similarly, lower locking portions 200*a* and 200*c* are similar and may be collectively referred to as lower locking portion(s) 200. The first container 10*a* may be configured to couple with another container (e.g., the second container 10*b* of FIG. 1*b*, the third container 10*c* of FIG. 1*c*, etc.) below the first container 10*a* or above the first container 10*a* (relative to the orientation shown in FIG. 1*a*), or any other object having a corresponding upper locking portion 100 and/or lower locking portion 200. Although the locking portions are shown in use with containers, this disclosure should not be limited to only containers and should be understood to contemplate other objects (e.g., utility boxes, pallets, tables, etc.).

The upper locking portion 100 may be configured to interface with a lower locking portion 200 of another object (e.g., the second container 10*b*) to secure or lock the first container 10*a* to the other object, thereby enabling a user to securely stack containers.

FIG. 1*d* shows a perspective view of the first container 10*a*, the second container 10*b*, and the third container 10*c* securely stacked using the locking portions 100 and 200 of containers 10*a*-*c*. As shown in FIG. 1*d*, the second upper locking portion 100*b* may interface with the first lower locking portion 200*a*, and the first upper locking portion 100*a* may interface with the third lower locking portion 200*c* to interlock the second container 10*b* with the first container 10*a* and the first container 10*a* with the third container 10*c*, respectively. The interfacing of an upper locking portion 100 with a lower locking portion 200 secures the respective containers to each other.

As shown in FIG. 1*d*, the second upper locking portion 100*b* of the second container 10*b* is interfaced with the first lower locking portion 200*a* of the first container 10*a*. The first upper locking portion 100*a* of the first container 10*a* is interfaced with the third lower locking portion 200*c* of the third container 10*c*. The third upper locking portion 100*c* of the third container 10*c* may be configured to couple with another lower locking portion 200 of another object (e.g. another container). As shown in FIG. 1*d*, the upper locking portion 100 may be positioned under the lower locking portion 200 (relative to the orientation shown in FIG. 1*d*) when interfacing the locking portions of containers.

Figure 2A:
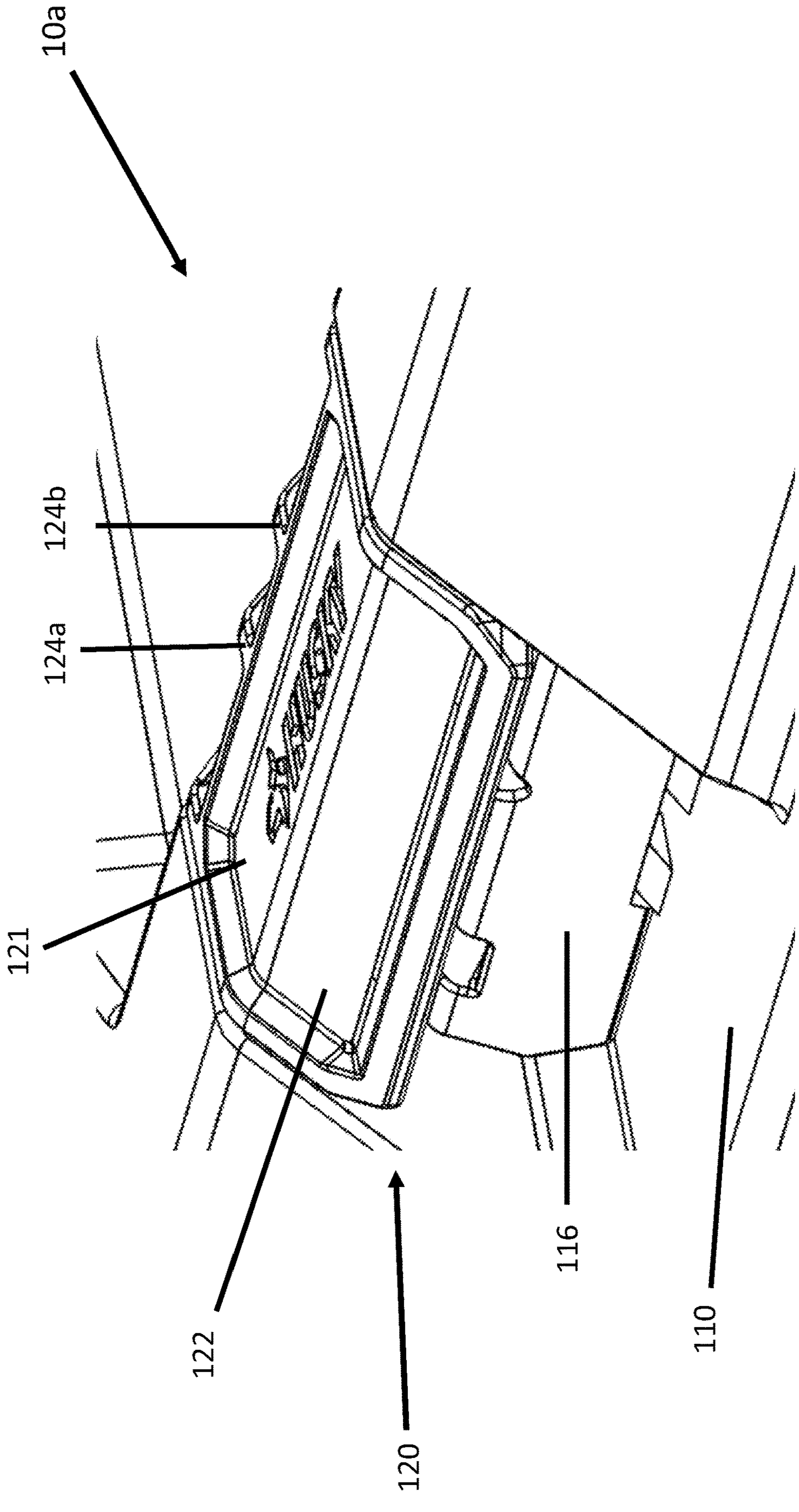
FIG. 2 *a* is a perspective view of an upper locking portion of the system of FIG. 1 *a*.

FIG. 2*a* is a perspective view of an upper locking portion of the system of FIG. 1*a*, in accordance with various embodiments of the present disclosure.

Figure 2B:
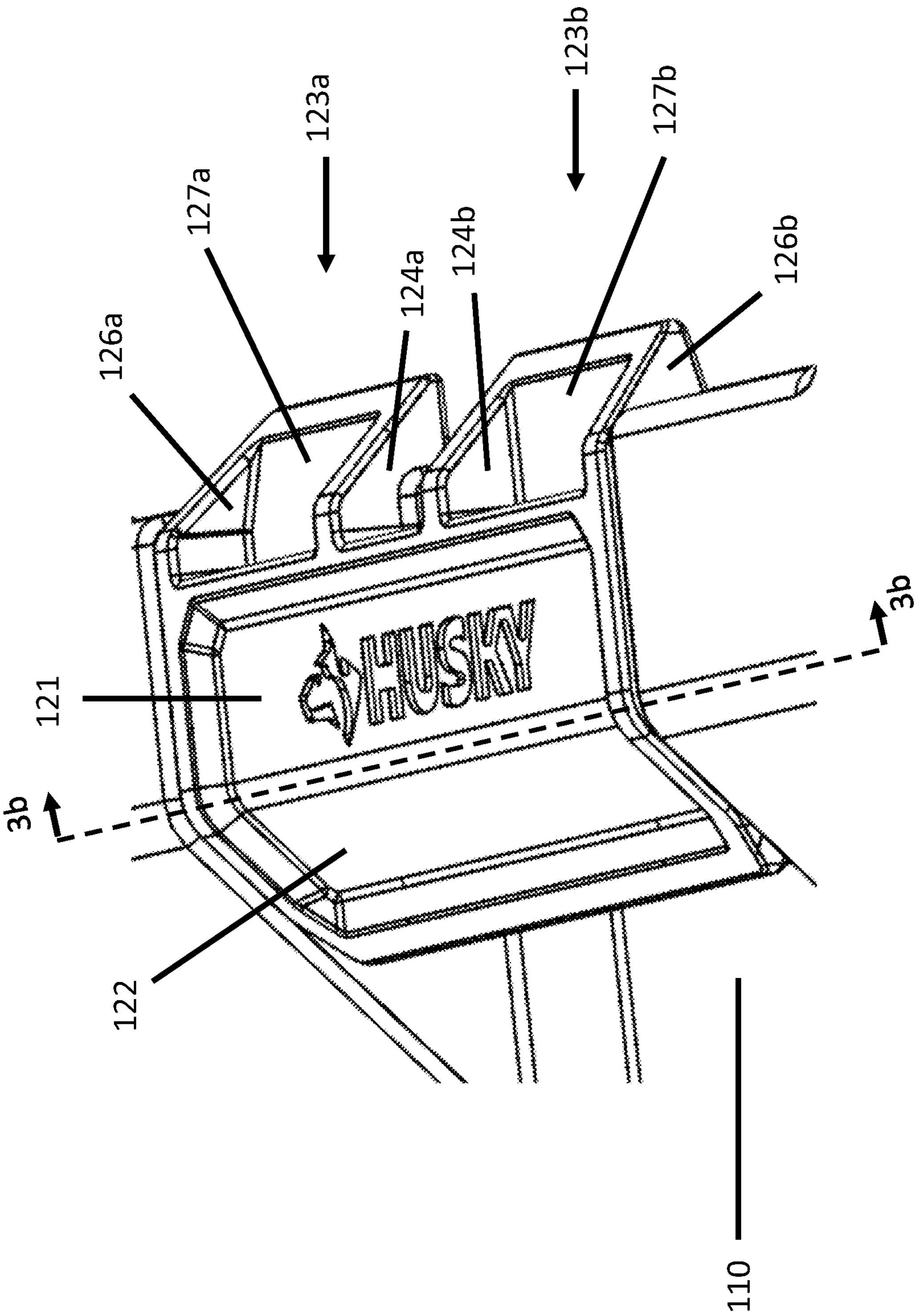

FIG. 2*b* is a side perspective view of the upper locking portion of FIG. 2*a*, in accordance with various embodiments of the present disclosure.

Figure 2C:
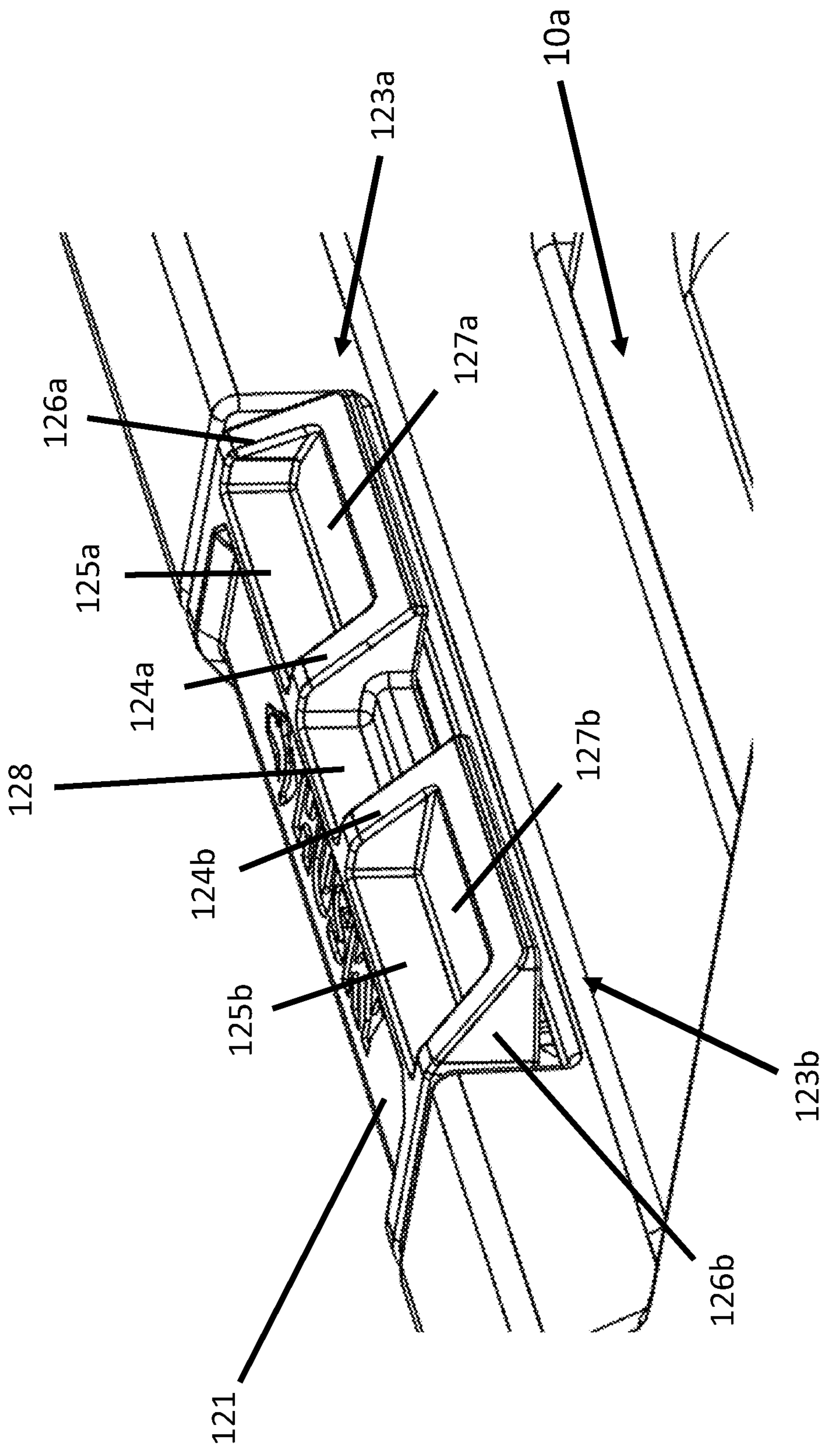

FIG. 2*c* is a rear perspective view of the upper locking portion of FIG. 2*a*, in accordance with various embodiments of the present disclosure.

Figure 2D:
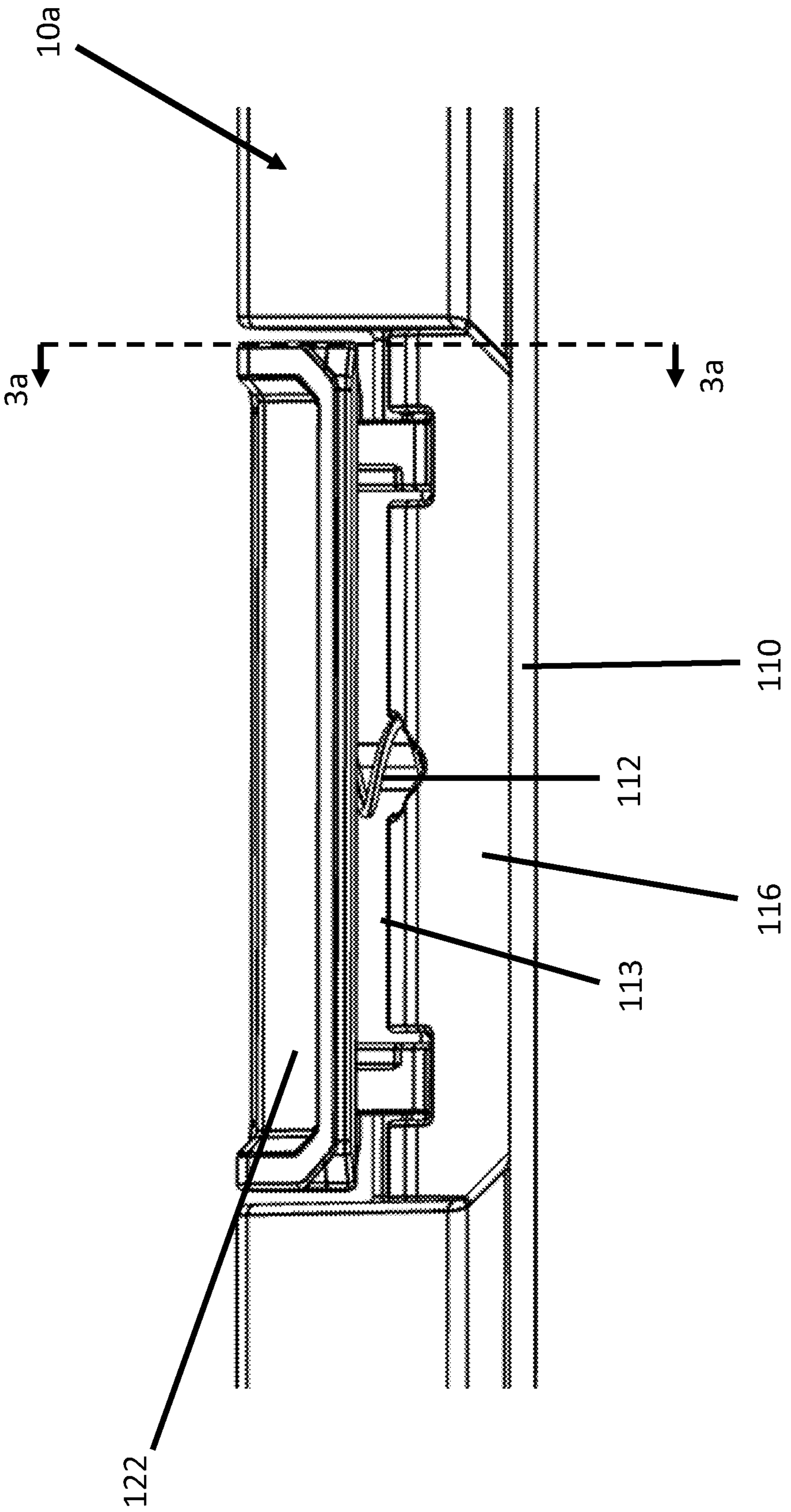

FIG. 2*d* is a rear view of the upper locking portion of FIG. 2*a*, in accordance with various embodiments of the present disclosure.

As shown in FIGS. 2*a*-*d* the first upper locking portion 100*a* of the first container 10*a* is similar to the second upper locking portion 100*b* and the third upper locking portion 100*c*, and may be referred to as the upper locking portion(s) 100.

The upper locking portion 100 may include a first jaw 120 (e.g. a first body) and a first mounting base 110. The first jaw 120 may be structured to rotate relative to the first mounting base 110 in order to selectively interact with the container to which the upper locking portion 100 is securing (e.g., first container 10*a* to second container 10*b*). The first jaw 120 may include a rear protrusion 122, a first base plane 121, and a first upper tooth 123*a* and a second upper tooth 123*b* (collectively "the upper teeth 123"). The rear protrusion 122 and the upper teeth 123 may extend from opposite sides of the first base plane 121. The rear protrusion 122 may be structured to receive a user input while matching an overall silhouette of the upper locking portion 100, such that the rear protrusion 122 may extend diagonally down relative to the first base plane 121 to the outer edge of the first container 10*a*. The upper teeth 123 may be structured to interface directly with a portion of the other container to secure the other container to the first container 10*a*, which is described in greater depth below with reference to FIG. 6*b*. Accordingly, the upper teeth 123 may extend laterally relative to the first base plane 121 to the relative center of the first container 10*a*.

As shown in FIG. 2*c*, the first upper tooth 123*a* may include a first tooth back wall 125*a*, a first tooth side wall 124*a*, a second tooth side wall 126*a*, and a tooth base plane 127*a*. Tooth base plane 127*a* may extend laterally to the relative center of the container 10*a*. The first tooth back wall 125*a* may extend longitudinally from the tooth base plane 127*a*. The first tooth side wall 124*a* may extend laterally from one end of the first tooth back wall 125*a* and longitudinally from one end of the tooth base plane 127*a*. The edge of the first tooth side wall 124*a* may angle down, relative to the tooth base plane 127*a*, to the relative center of the first container 10*a*. The second tooth side wall 126*a* may extend laterally from one end of the first tooth back wall 125*a*, that end being opposite of the end from which the first tooth side wall 124*a* may extend. The second tooth side wall 126*a* may extend longitudinally from one end of the tooth base plane 127*a*, that end being opposite of the end from which the first tooth side wall 124*a* extends. The edge of the second tooth side wall 126*a* may angle down, relative to the tooth base plane 127*a*, to the relative center of the first container 10*a*.

As shown in FIG. 2 *c*, the first tooth side wall 124 *a*, the second tooth side wall 126 *a*, the first tooth back wall 125 *a*, and the tooth base plane 127 *a* collectively form a cavity of the first upper tooth 123 *a* which may be configured to receive a corresponding first lower tooth 223 *a* of the lower locking portion 200. For example, when the lower locking portion 200 is rotated in order to decouple two containers, the first lower tooth 223 *a* may be received by the cavity of the first upper tooth 123 *a*, and the subsequent contact may cause the upper locking portion 100 to rotate, which is described in greater depth below with reference to FIG. 6 *b*. The first upper tooth 123 *a* and the second upper tooth 123 *b* may be separated by an interior back wall 128. As shown in FIG. 2 *c*, the second upper tooth 123 *b* may be a mirror image of the first upper tooth 123 *a* relative to the interior back wall 128. Accordingly, the second upper tooth 123 *b* includes a first tooth side wall 124 *b*, second tooth side wall 126 *b*, first tooth back wall 125 *b*, and the tooth base plane 127 *b* that collectively form a cavity of the second upper tooth 123 *b* which may be configured to receive a corresponding second lower tooth 223 *b* of the lower locking portion 200. In some embodiments, the first jaw 120 may include a single tooth (e.g. a "first protrusion") which couples with a single corresponding tooth of the lower locking portion 200. In some embodiments, the first jaw 120 may include multiple teeth (collectively, e,g, "a first protrusion") which couple with the corresponding teeth from the lower locking portion 200.

Figure 3A:
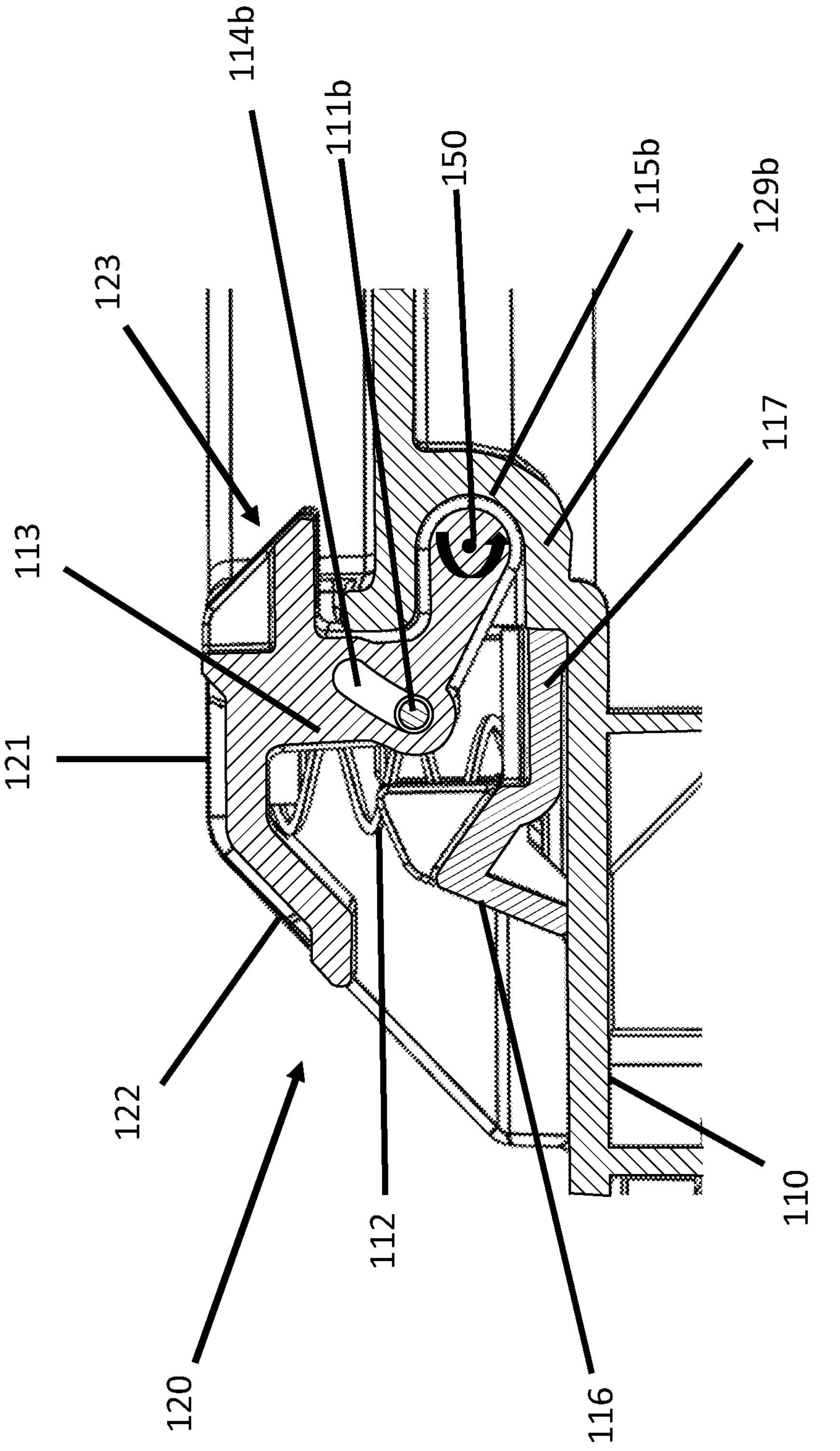
FIG. 3 *a* is a side cross-sectional view of the upper locking portion of FIG. 2 *a*, taken along line 3*a*-3*a* in FIG. 2*d*.

FIG. 3*a* is a side cross-sectional view of the upper locking portion of FIG. 2*a* taken along line 3*a*-3*a* in FIG. 2*d*, in accordance with various embodiments of the present disclosure.

Figure 3B:
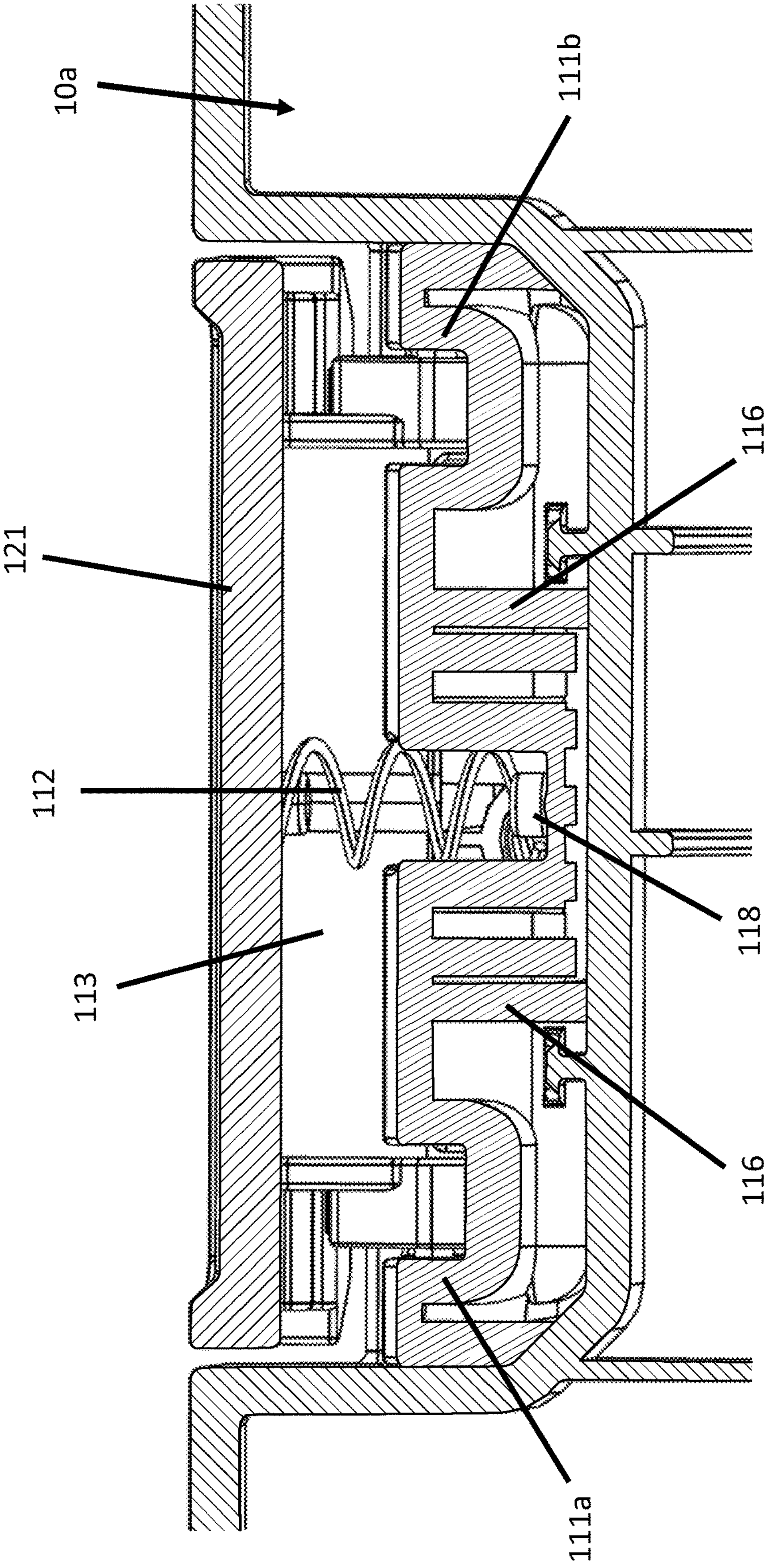

FIG. 3*b* is a front cross-sectional view of the upper locking portion of FIG. 2*a* taken along line 3*b*-3*b* in FIG. 2*b*, in accordance with various embodiments of the present disclosure.

As shown in FIGS. 3*a*-*b*, the first jaw 120 maintains the shown position (e.g., a locking position) by a first resilient member 112 when not interfaced with a second jaw 220 of the lower locking portion 200. The first resilient member 112 may be connected on one end to a first base plane 121 of the first jaw 120 and on an opposite end to a first resilient member base 118 on a mounting plane 117. The first resilient member 112 may be configured to bias the first jaw 120 into a locking position while interfaced with the second jaw 220 of the lower locking portion 200 by providing an opposing force to the first base plane 121 when compressed due to a downward force exerted on the first jaw 120 (see FIG. 6*b* for more detail). This opposing force from the first resilient member 112 may maintain the shown position of the first jaw 120 by resisting the downward force caused by the first jaw 120 rotating counterclockwise (relative to the orientation shown in FIG. 3*a*). In some embodiments, the first resilient member 112 may be connected to any surface on the first jaw 120 and on an opposite end to a mounting plane of the upper locking portion. In some embodiments, the first resilient member 112 may be one of many resilient members configured to maintain the shown position (e.g., "locking position") of the first jaw 120. In some embodiments, the first resilient member 112 can be of any tension which may be configured to maintain a desired position of the first jaw 120. In some embodiments, first resilient member 112 may include a spring.

As shown in FIGS. 3*a*-*b*, the upper locking portion 100 may include a first jaw back wall 113. The first jaw back wall 113 may include a first arm 115*a* and a second arm 115*b* (collectively "arms 115" or e.g. a "first pivot") which extend diagonally down relative to the first jaw back wall 113 towards the relative center of the first container 10*a*. The arms 115 may be received by a first cavity 129*a* and a second cavity 129*b* (collectively "cavities 129") in the first container 10*a*. The cavities 129 (or recesses) are shown in greater depth in FIG. 3*d*. The arms 115 may be configured to rotate within the cavities 129, and this axis 150 of rotation may define the pivot point about which the entire upper locking portion turns. In some embodiments, the arms 115 are "floating" within the cavities 129, such that the arms 115 are able to freely rotate within the cavities 129 and are not coupled to the cavities 129. This floating design may enable the first locking portion 100 to be selectively coupled to the first container 10*a*, such that the first locking portion 100 may be removed or replaced (e.g., for maintenance) without otherwise altering or affecting the first container 10*a*. In other embodiments, a pin is included to extend from the first container 10*a* through the arms 115 to fix the axis 150 of rotation of the arms 115 within the cavities 129.

As shown in FIG. 3*a*, the upper locking portion 100 may further include a rear wall 116. The rear wall 116 may provide a limit for movement of the first jaw 120, such that as the first jaw 120 rotates about axis 150 defined by the arms 115 within the cavities 129, the rear protrusion 122 may contact the rear wall 116, which prevents further rotation. The arms 115, the first jaw back wall 113, and the first jaw 120 may be interconnected such that the first jaw back wall 113, and the first jaw 120 collectively rotate about the axis 150 to enable the first jaw 120 to rotate down relative to the shown position of the first container 10*a* so the rear protrusion 122 is proximate to the rear wall 116. This rotation also causes the upper teeth 123 to move laterally away from the relative center of the first container 10*a*, which effectively decouples the first container 10*a* from another container (as described below with reference to FIG. 6*b*).

The first jaw back wall 113 may extend longitudinally to a bottom (relative to the position shown in FIG. 3 *a*) of the first container 10 *a*. The first jaw back wall 113 may include a second groove 114 *b* and a corresponding first groove (not shown) (collectively "grooves 114"), that are shaped to follow an axis of rotation (e.g., about the arms 115) of the upper locking portion 100. The upper locking portion 100 may include a first upper pin 111 *a* and a second upper pin 111 *b*, (collectively "first pins 111") that may extend from the first mounting base 110 to be coupled with the grooves 114, which guide the first jaw 120 to pivotably rotate with respect to the first mounting base 110. The first pins 111 may be fixed to the first mounting base 110, such that the first pins 111 move freely within the grooves 114. The grooves 114 may be structured to further define a range of movement for the first jaw 120, as the interaction of the first pins 111 with the grooves 114 prevents rotation of the first jaw 120 when the first pins 111 are at an end of the grooves 114.

As shown in FIG. 3*a*, the grooves 114 are curved with a relative top end proximate the upper teeth 123 and a relative bottom end proximate the arms 115. In the locked position shown in FIG. 3*a*, the second upper pin 111*b* is shown at the relative bottom of the second groove 114*b*. In an unlocked position (e.g., the resilient member 112 is compressed and the rear protrusion 122 is proximate the rear wall 116), the second upper pin 111*b* is at the relative top of the second groove 114*b*.

Figure 3C:
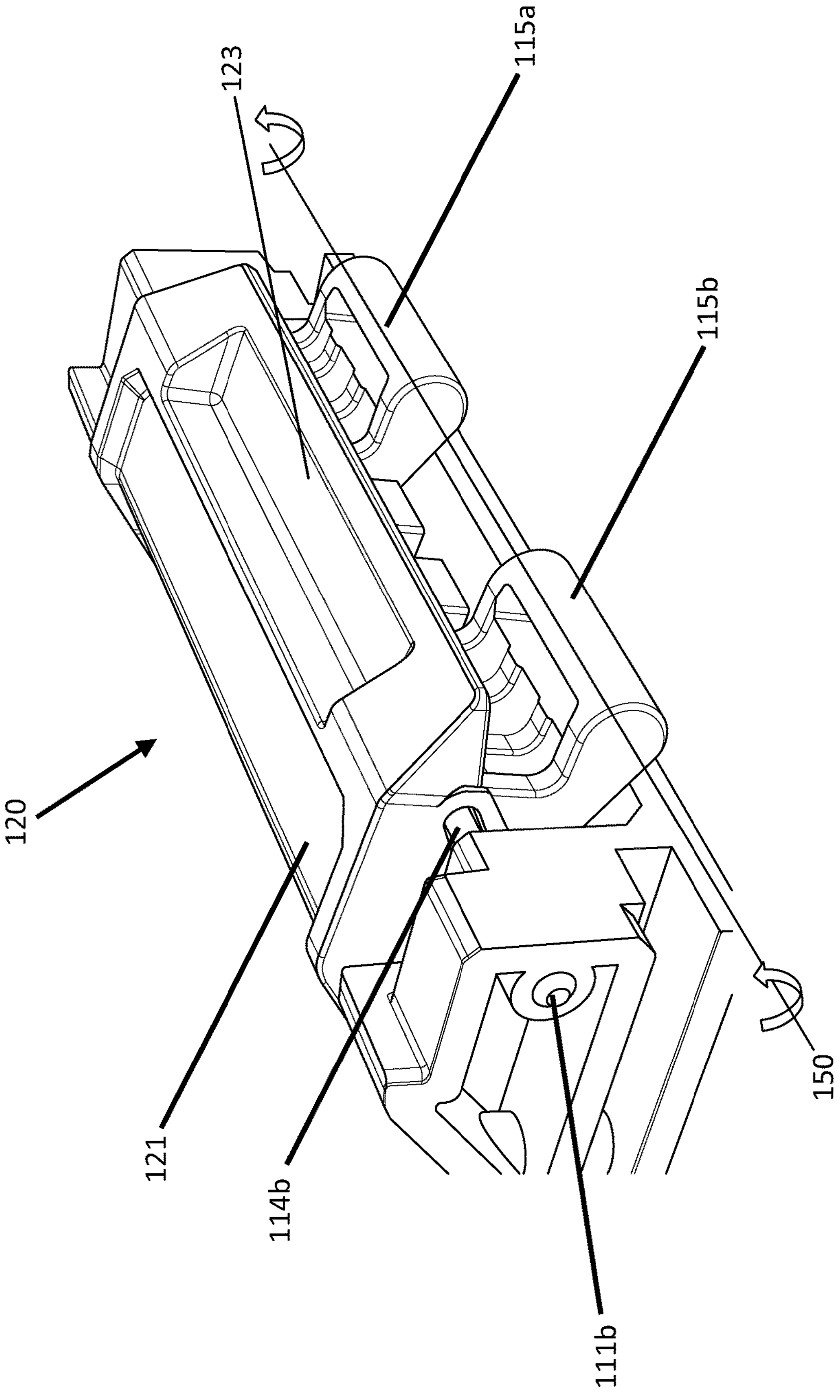

FIG. 3*c* is a side perspective view of the upper locking portion of FIG. 2*a*, in accordance with various embodiments of the present disclosure.

Figure 3D:
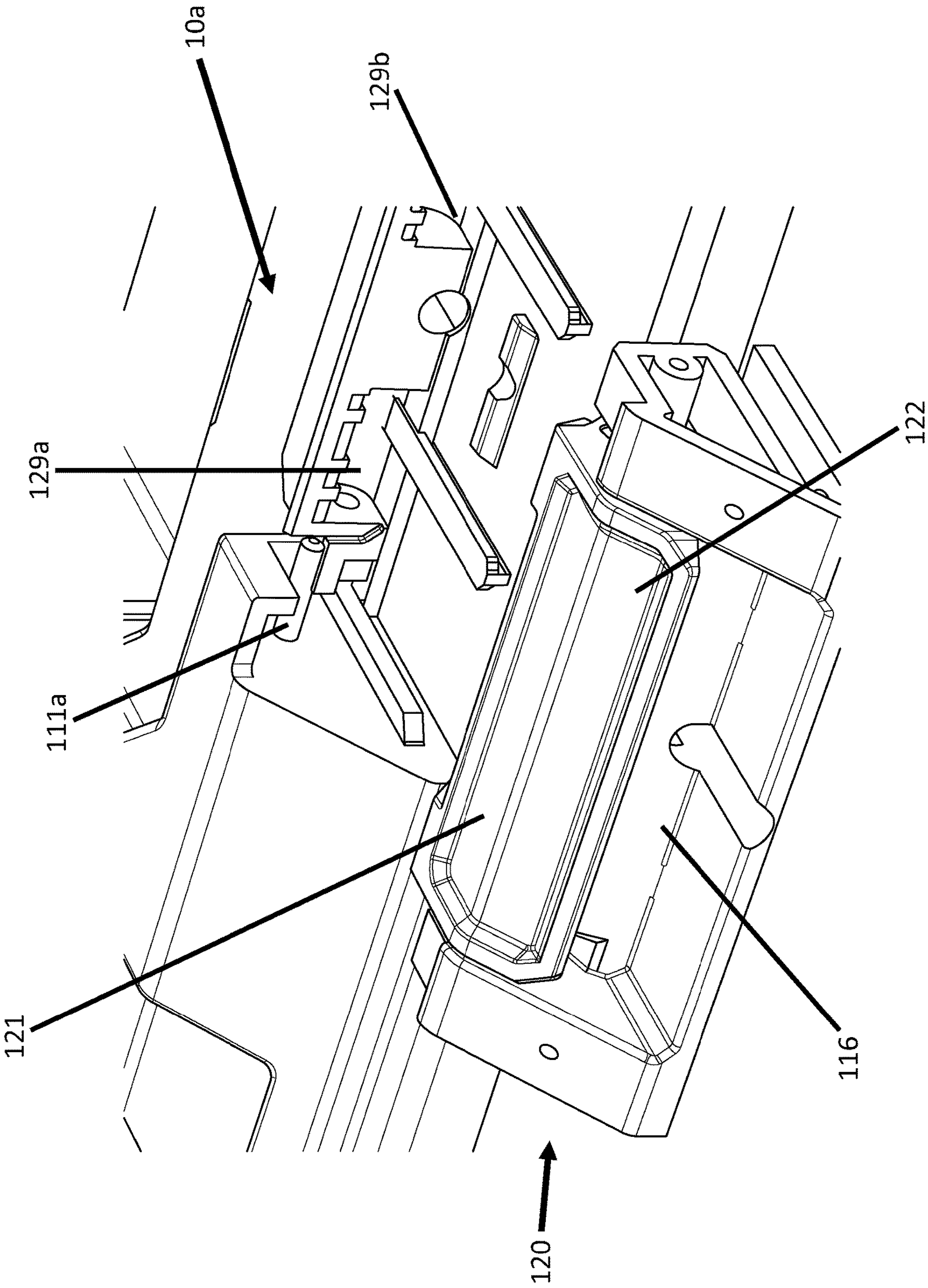

FIG. 3*d* is a front perspective view of the upper locking portion of FIG. 2*a*, in accordance with various embodiments of the present disclosure.

As shown in FIGS. 3*c-d*, the upper jaw 120 may include a single upper tooth 123. As such, it should be understood that upper jaw 120 may include any number of upper teeth 123. As shown in FIG. 3*d*, the upper locking portion 100 may be connected to the top (relative to the position shown in FIG. 3*d*) of first container 10*a* via the cavities 129. In particular, arms 115 of the upper locking portion 100 may be inserted into the cavities 129. Furthermore, FIGS. 3*c-d* illustrate that the upper locking portion may be selectively decoupled from the first container 10*a*, which enables removal or replacement of the upper locking portion 100 without altering or otherwise affecting the first container 10*a*.

Figure 4A:
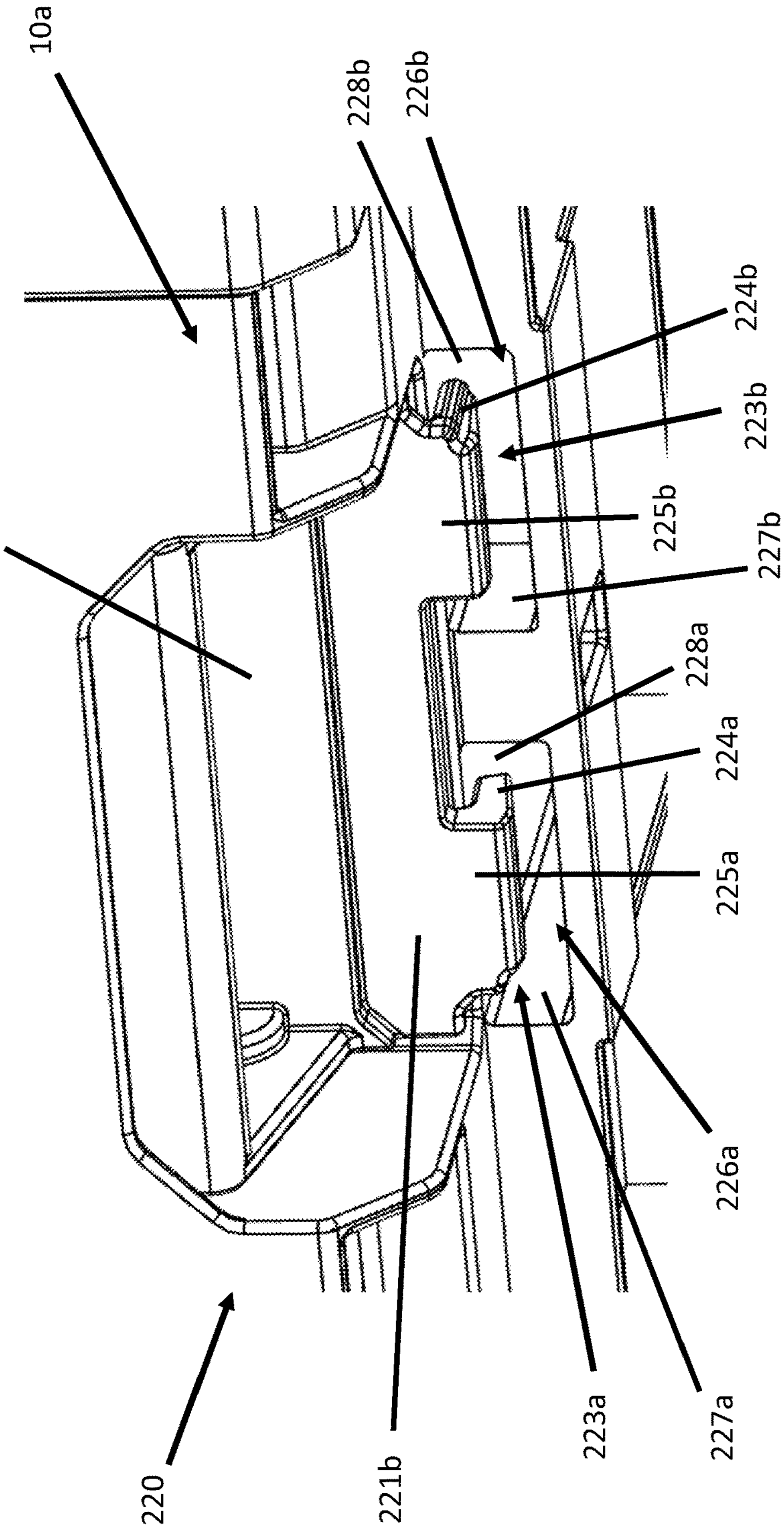
FIG. 4 *a* is a perspective view of a lower locking portion of the system of FIG. 1 *a*.

FIG. 4*a* is a perspective view of a lower locking portion of the system of FIG. 1*a*, in accordance with various embodiments of the present disclosure.

Figure 4B:
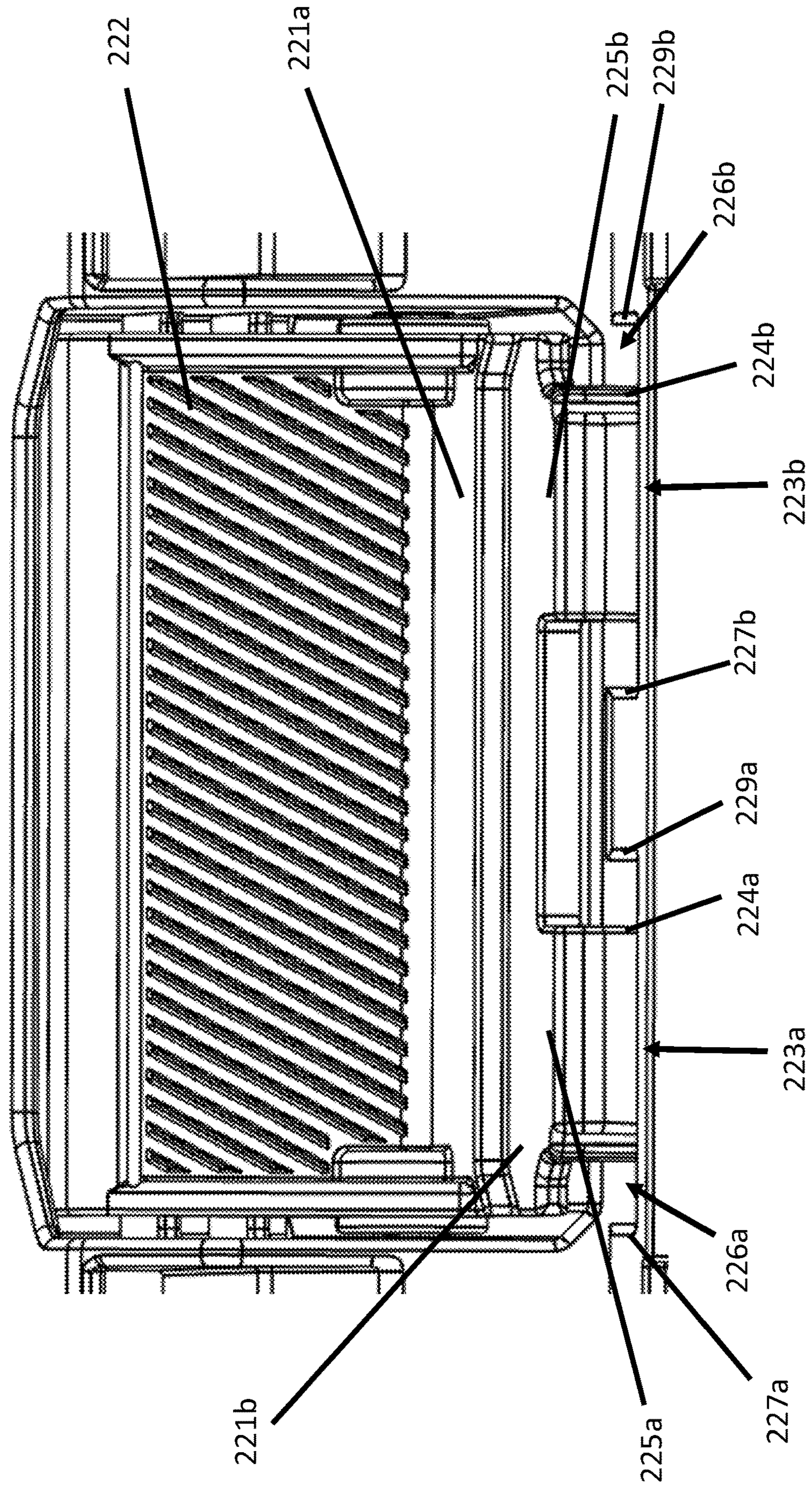

FIG. 4*b* is a bottom perspective view of the lower locking portion of FIG. 4*a*, in accordance with various embodiments of the present disclosure.

Figure 4C:
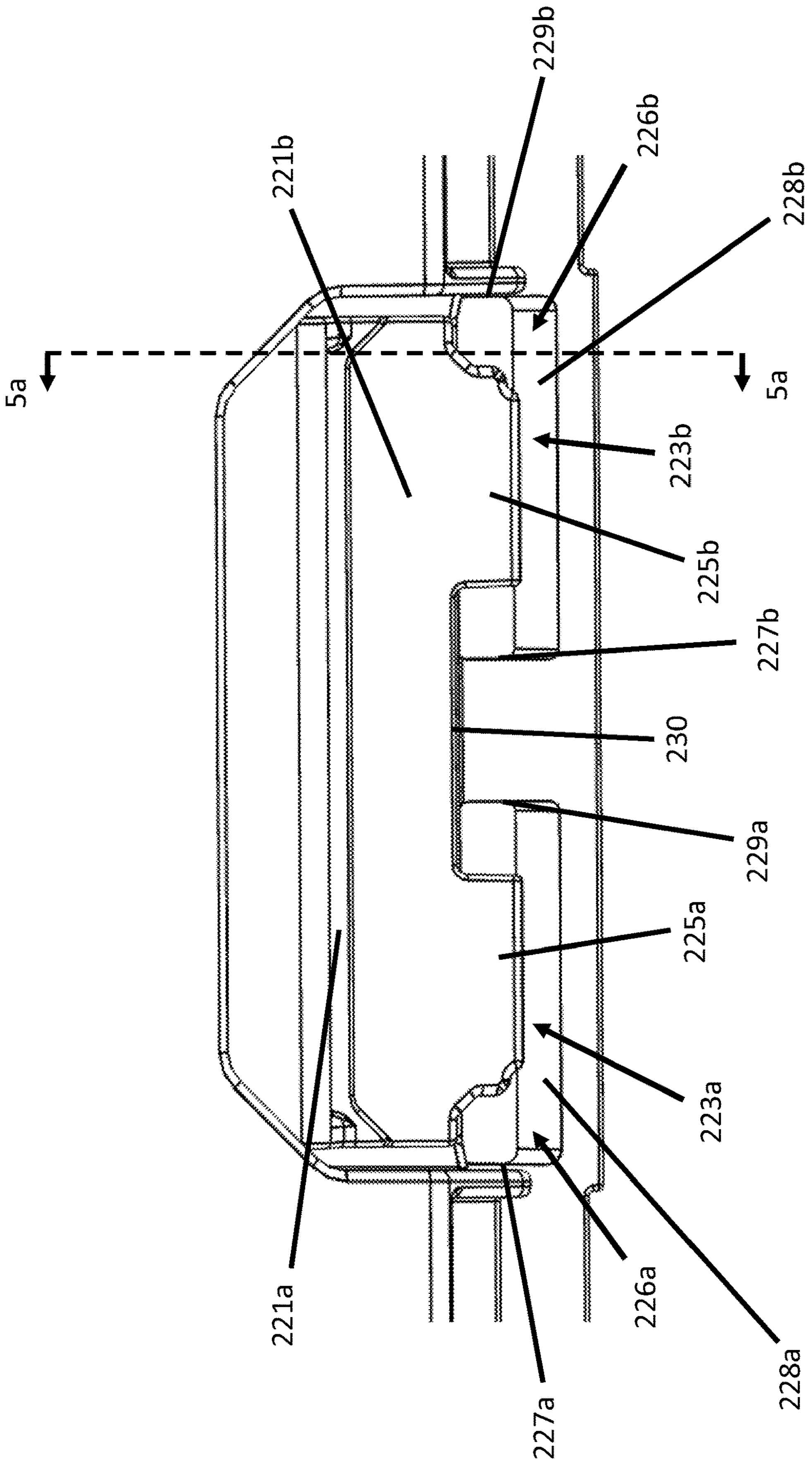

FIG. 4*c* is a front perspective view of the lower locking portion of FIG. 4*a*, in accordance with various embodiments of the present disclosure.

As shown in FIGS. 4 *a-c*, the first lower locking portion 200 *a* is similar to the second lower locking portion and the third lower locking portion 200 *c*, and may be referred to as the lower locking portion(s) 200. The lower locking portion 200 may include a second jaw 220 and a second mounting base 210. The second jaw 220 may include an upper back wall 221 *a* and a lower back wall 221 *b* (collectively "the second jaw back wall 221"), a surface 222, and a first lower tooth 223 *a* and a second lower tooth 223 *b* (collectively "lower teeth 223"). The first lower tooth 223 *a* may protrude laterally to the relative center of the first container 10 *a* inside a first cavity 226 *a* of the first container 10 *a*. The second lower tooth 223 *b* may be configured to protrude laterally to the relative center of the first container 10 *a* inside a second cavity 226 *b* of the first container 10 *a*. Although the lower teeth 223 are shown as relatively L-shaped, with a tooth front wall 225 *a* extending relatively parallel to a side of the first container 10 *a* and a tooth protrusion 224 *a* extending laterally from the tooth front wall 225 *a* to the relative center of the container 10 *a*, it should be contemplated that the tooth protrusion 224 *a* may be omitted, such that the lower teeth 223 extend only in parallel to the side of the first container 10 *a* (e.g., the lower teeth 223 only include the tooth front wall 225 *a*). As shown in FIG. 4 *a-c*, the second lower tooth 223 *b* may be a mirror image of the first lower tooth 223 *a* relative to a ridge 230. Accordingly, the second lower tooth 223*b* may include a tooth front wall 225 *b* extending relatively parallel to a side of the first container 10 *a* and a tooth protrusion 224 *b* extending laterally from the tooth front wall 225 *b* to the relative center of the container 10 *a*. The first cavity 226 *a* and the second cavity 226 *b* (collectively "cavities 226") are shaped to couple with teeth 123 of the upper locking portion, which is shown in greater depth in FIG. 6 *b*.

As shown in FIGS. 4*a-c*, the first cavity 226*a* may include a first cavity side wall 227*a*, a second cavity side wall 229*a*, and a first cavity base plane 228*a*. The first cavity base plane 228*a* may extend laterally to the relative center of the first container 10*a*. The first cavity side wall 227*a* may extend longitudinally from the first cavity base plane 228*a*. The second cavity side wall 229*a* may extend longitudinally from one end of the first cavity base plane 228*a*, that end being opposite of the end from which the first cavity side wall 227*a* extends.

As shown in FIG. 4 *c*, the first cavity side wall 227 *a*, the second cavity side wall 229 *a*, and the first cavity base plane 228 *a* collectively form the first cavity 226 *a* which may be configured to couple with the corresponding first upper tooth 123 *a* of the upper locking portion 100. The first cavity 226 *a* and the second cavity 226 *b* are separated by the ridge 230. As shown in FIG. 4 *c*, the first cavity 226 *a* may be a mirror image of the second cavity 226 *b* relative to the ridge 230. Accordingly, the first cavity side wall 227 *b*, the second cavity side wall 229 *b*, and the first cavity base plane 228 *b* collectively form the second cavity 226 *b* which may be configured to couple with the corresponding second upper tooth 123 *b* of the upper locking portion 100. The first cavity base plane 228 *a* and the second cavity base plane 228 *b* (collectively "cavity base planes 228") may be configured to couple with the corresponding upper teeth 123 from the upper locking portion 100.

As shown in FIGS. 4*a-c*, the second jaw back wall 221 may extend longitudinally down to the bottom (relative to the position shown in FIG. 4*c*) of the first container 10*a*. The surface 222 may extend laterally from the second jaw back wall 221 to the outer edge of the first container 10*a*. As shown in FIG. 4*a-c*, the surface 222 is shaped to enable a user to place their hand when gripping the lower locking portion 200. The surface 222 may be textured (as shown in FIG. 4*b*) to provide an improved grip.

FIG. 5*a* is a side cross-sectional view of the lower locking portion of FIG. 4*a* taken along line 5*a*-5*a* in FIG. 4*c*, in accordance with various embodiments of the present disclosure.

Figure 5:
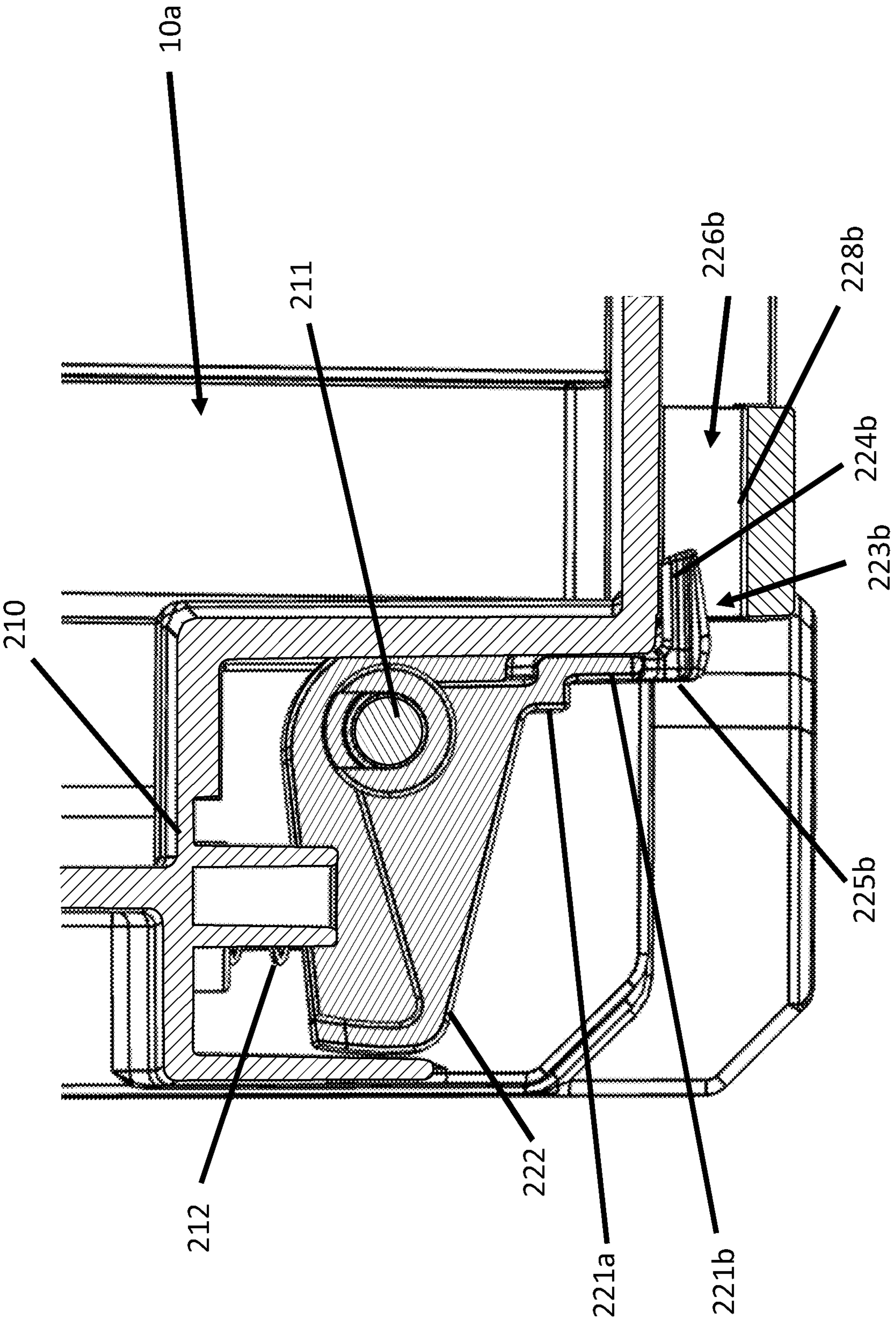
FIG. 5 *a* is a side cross-sectional view of the lower locking portion of FIG. 4 *a*, taken along line 5*a*-5*a* in FIG. 4*c*.

The second jaw 220 may maintain the position shown in FIGS. 5 *a-b* (when not interfacing with the first jaw 120 of the first locking portion 100) by a second resilient member 212. The second resilient member 212 may be connected on one end to a second resilient member base 218 of the second jaw 220 and on an opposite end to a second mounting base 210. The second resilient member 212 may be configured to bias the second jaw 220 into a locking position while interfaced with the first jaw 120 of the first locking portion 100 by providing an opposing force to the second jaw 220 via the second resilient member base 218 when compressed due to an upward force exerted on the second jaw 220 (see FIG. 5 *b* for more detail). This opposing force from the second resilient member 212 may maintain the shown position (e.g., a "locking" position) of the second jaw 220 by resisting the upward force. In some embodiments, the second resilient member 212 may be connected to any surface on the second jaw 220 and on an opposite end to a mounting plane of the lower locking portion. In some embodiments, the second resilient member 212 may be one of many resilient members configured to maintain the shown position of second jaw 220. In some embodiments, the second resilient member 212 can be of any tension which may be configured to maintain a desired position of second jaw 220. In some embodiments, the second resilient member 212 may include a spring.

As shown in FIG. 5 *a*, the lower locking portion 200 may include a second pin 211 (e.g. a "second pivot") which may extend laterally across the second jaw back wall 221 of the second jaw 220 to enable the second jaw 220 to rotate with respect to the second mounting base 210. The second jaw back wall 221 may house the second pin 211. The second pin 211 may be configured to rotate within the housing of the second jaw back wall 221 to enable the second jaw 220 to pivotably rotate with respect to the second mounting base 210. The second jaw 220 may be configured to pivotably rotate about the second pin 211 to enable the second jaw 220 to rotate up (relative to the second jaw back wall 221) so that the surface 222 is proximate to the second mounting base 210. The second locking portion 200 may be configured such that the lower teeth 223 slide out of the cavities 226 to the outer edge of the first container 10 *a* when the second jaw 220 rotates about the second pin 211.

Figure 6A:
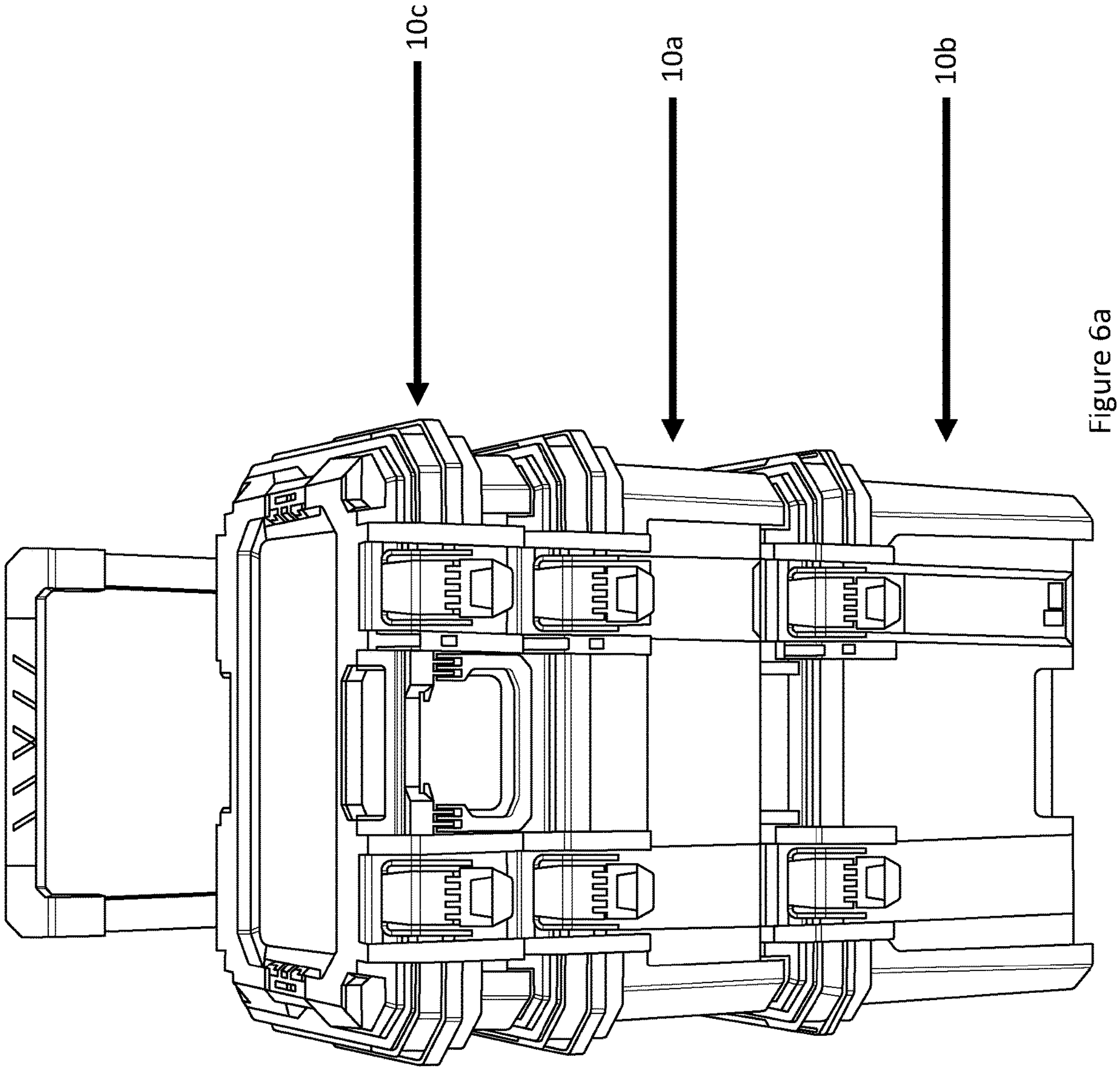
FIG. 6 *a* is a front perspective view of the first, second, and third containers of FIGS. 1 *a-c* stacked and secured using the system for interlocking containers.

FIG. 6*a* shows a prospective view of the first container 10*a*, second container 10*b*, and third container 10*c* securely stacked using the locking portions 100 and 200 of containers 10*a-c*.

FIG. 6*a* is a front perspective view of the first, second, and third containers of FIGS. 1*a-c* stacked and secured using the system for interlocking containers, in accordance with various embodiments of the present disclosure.

Figure 6B:
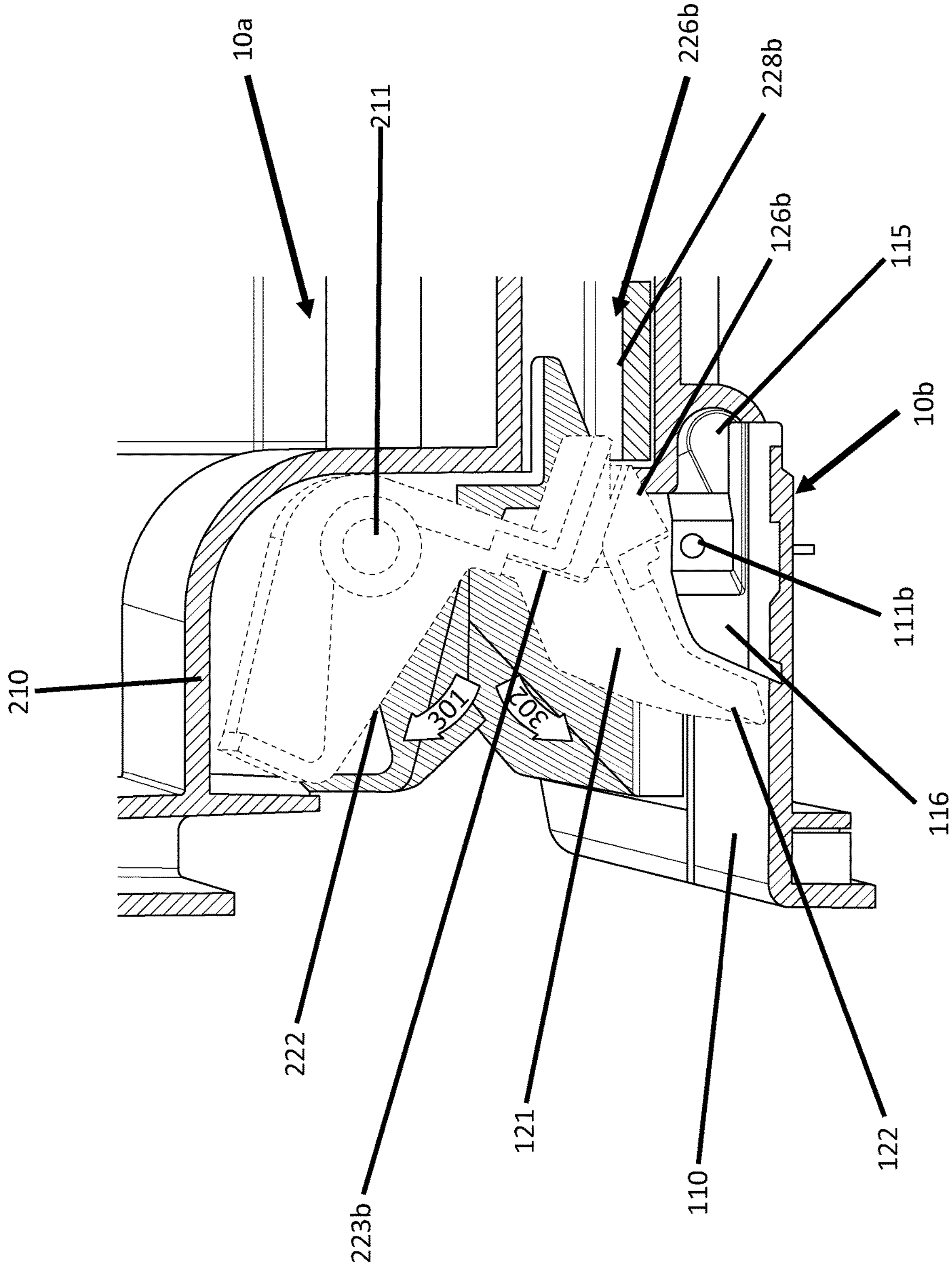

FIG. 6*b* is a side cross-sectional view of an intersection between the upper locking portion of FIG. 1*a* and the lower locking portion of FIG. 4*a* taken along line 6*b*-6*b* in FIG. 6*a*, in accordance with various embodiments of the present disclosure.

As shown in FIG. 6*b*, the upper locking portion 100 of the second container 10*b* and the lower locking portion 200 of the first container 10*a* may interact to selectively secure the first container 10*a* to the second container 10*b*. The upper locking portion 100 may couple with the lower locking portion 200 as the containers are stacked, relative to the position shown in FIG. 6*b*. When the first container 10*a* is initially placed on the second container 10*b*, the second cavity base plane 228*b* applies a force to the slanted surface of the upper teeth 123, which is translated to rotational movement of the first jaw 120 about the arms 115. This force causes the first jaw 120 to rotate counter-clockwise (relative to the orientation of FIG. 6*b*), and causes the upper teeth 123 to move relatively away from the first container 10*a*. Once the first container 10*a* is positioned in place (e.g., a relative bottom of the first container 10*a* is flush with a top of the second container 10*b*), the second cavity base plane 228*b* is no longer applying force to the upper teeth 123, and the first resilient member 112 causes the first jaw 120 to return to the locked position, which causes the upper teeth 123 to enter the cavities 228. The interaction between the upper teeth 123 and the second cavity base plane 228*b* (e.g., the upper teeth 123 abutting the first container 10*a*) secures the first container 10*a* in place relative to the second container 10*b*.

As shown in FIG. 6*b*, a user may apply pressure to the surface 222 of the lower locking portion 200 as indicated by arrow 301, causing the second jaw 220 to rotate clockwise (relative to the orientation of FIG. 6*b*) about the second pin 211. As the second pin 211 rotates within the housing of the second jaw back wall 221, the lower teeth 223 rotate to the outer edge of the containers and make contact with or abut the upper teeth 123 (e.g., the first tooth back wall 125*a* and a second tooth back wall 125*b*, collectively teeth back walls 125) of the first jaw 120. This contact causes the first jaw 120 to rotate counter-clockwise (relative to the orientation of FIG. 6*b*) as indicated by arrow 302 to the outer edge of the second container 10*b*. The upper teeth 123 are then disengaged from the cavities 228, such that the upper teeth 123 are no longer abutting or applying a securing force to the first container 10*a*. After the upper locking portion 100 and the lower locking portion 200 are disengaged and the second container 10*b* and the first container 10*a* are respectively decoupled, the upper locking portion 100 returns to the maintained (e.g., locked) position shown in FIGS. 2*a-d*. The lower locking portion 200 returns to the maintained (e.g., locked) position shown in FIG. 4*a-c*.

In some embodiments, the system for interlocking containers may omit the lower locking portion 200, such that the upper locking portion 100 may selectively secure the two containers together without interaction with the lower locking portion 200. FIG. 7 *a* is a perspective view of a container 10 having only the upper locking portion 100, in accordance with various embodiments of the present disclosure. FIG. 7 *b* is a perspective view of an upper locking portion 100 of the system of FIG. 7 *a*, in accordance with various embodiments of the present disclosure.

Figure 7A:
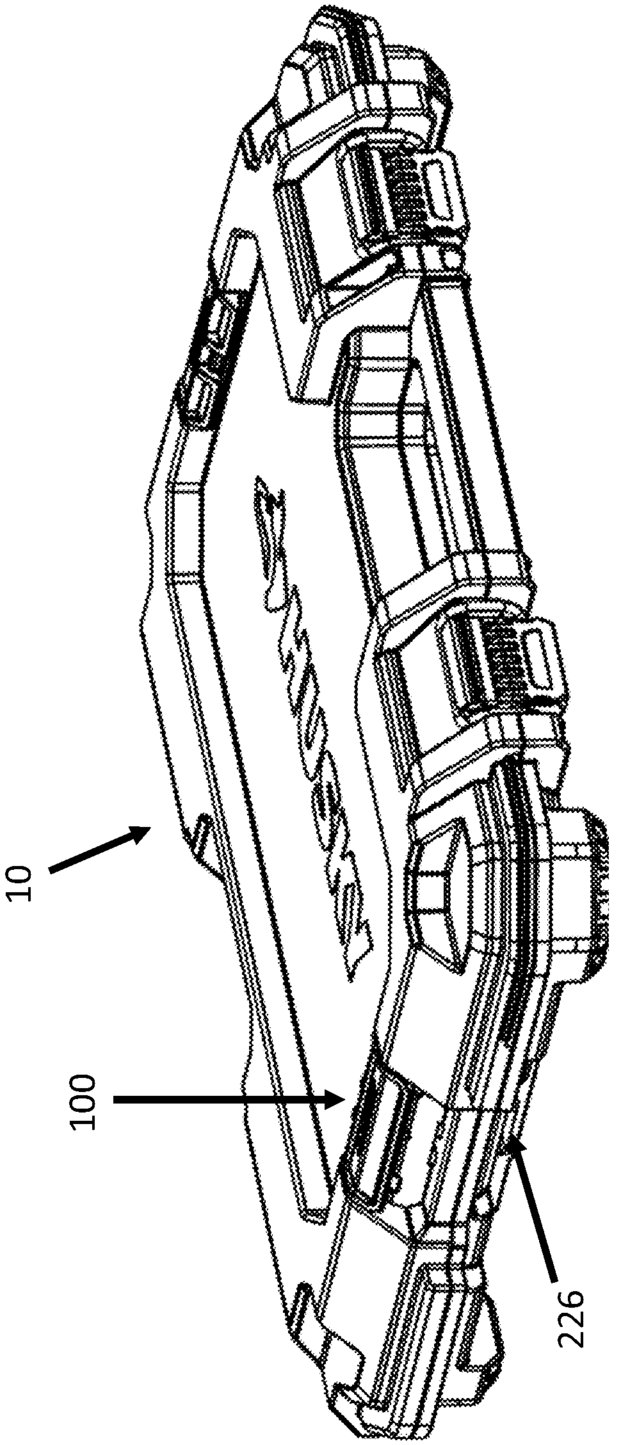
FIG. 7 *a* is a perspective view of a container having a system for interlocking containers.
Figure 7B:
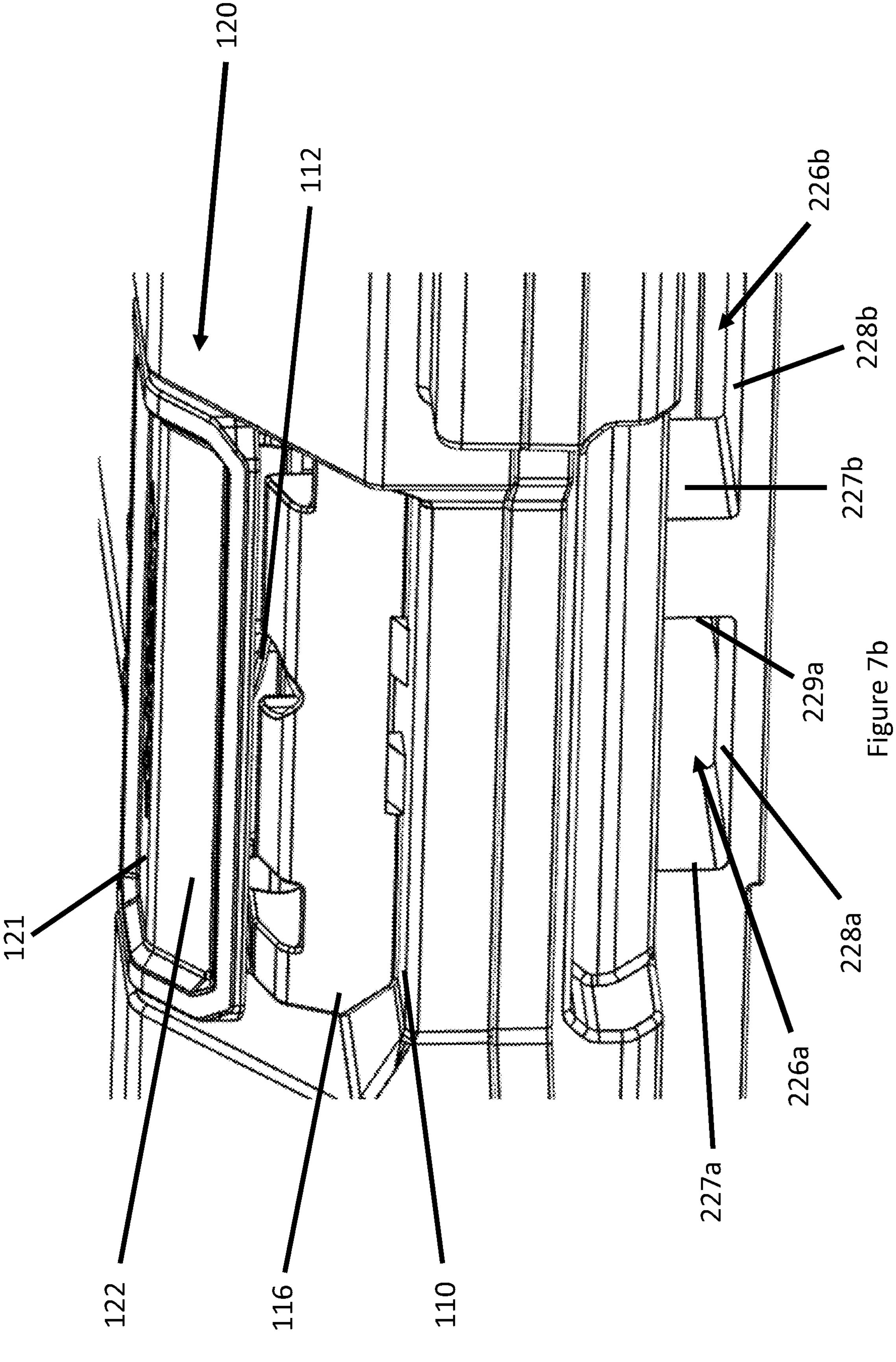

As shown in FIG. 7*b*, the upper locking portion 100 is identical to the upper locking portion 100 described with reference to FIGS. 3*a-d*. Similarly, the first and second cavities 228*a-b* are identical to the first and second cavities 228*a-b* described with reference to FIG. 6*b*, such that the upper locking portion 100 of a bottom container (e.g., first container 10*a*) interacts with the first and second cavities 228*a-b* of a top container (e.g., third container 10*c*) to secure the two containers together. The primary difference in these embodiments in which the lower locking portion 200 is omitted may be found in the decoupling process. As described with reference to FIG. 6*b*, the two secured containers may be decoupled by applying a force (indicated by arrow 301) relatively upwards onto the lower locking portion 200, which causes the lower locking portion 200 to rotate. This rotation applies a rotational force onto the upper locking portion 100 (as indicated by arrow 302), which causes the upper locking portion 100 to rotate outwards and disengage from the cavities 228. In those embodiments in which the lower locking portion 200 is omitted, the application of force indicated by arrow 301 is skipped, such that the rotational force is applied directly to the upper locking portion 100 along arrow 302, rather than being translated from force applied to the lower locking portion 200.

By omitting the lower locking portion 200, the number of moving parts in the system may be reduced, such that the chances of mechanical failure are lowered. Furthermore, removing the lower locking portion 200 saves space on the container, such that the container may maintain a smaller side profile and/or height. An example of this smaller container is shown in FIG. 7*a*, which may be compared to the example containers illustrated in FIGS. 1*a-d*.

Although certain example systems and methods have been described herein, the scope of coverage of this patent is not limited thereto. On the contrary, this patent covers all systems, methods, apparatus, and articles of manufacture fairly falling within the scope of the appended claims either literally or under the doctrine of equivalents.

What is claimed is:

1. A system for securing a first container to a second container, the system comprising:

an upper locking portion comprising:

- a first body having a first protrusion extending laterally from the first body towards a relative center of the first container;
- a first pivot structured to interface with a recess of the first container; and
- a first spring configured to bias the upper locking portion in a locked position; and a lower locking portion comprising:

a second body having a surface and a second protrusion extending along a side of the second container;

a second pivot structured to pivotably couple the second body to the second container; and a second spring configured to bias the lower locking portion in a locked position; and wherein, in a configuration in which the first container is locked to the second container by the upper locking portion and the lower locking portion:

the first protrusion abuts the second container and restricts movement of the second container, the surface of the second body is configured to receive a force and to cause the lower locking portion to rotate about the second pivot to an unlocked position of the lower locking portion, the rotation of the lower locking portion to the unlocked position of the lower locking portion causes the second protrusion to abut the first body and cause the upper locking portion to rotate to an unlocked position of the upper locking portion, and the rotation of the upper locking portion to the unlocked position of the upper locking portion causes the first protrusion to disengage from the second container.

2. The system of claim 1, wherein the first pivot is not fixed to the recess.

3. The system of claim 1, wherein the upper locking portion further comprises:

a groove positioned in a side of the first body, the groove curved about an axis of rotation defined by the first pivot; and a pin extending from the first container into the groove.

4. The system of claim 3, wherein the pin interacting with a first end of the groove defines the locked position of the upper locking portion, and the pin interacting with a second end of the groove defines the unlocked position of the upper locking portion.

5. The system of claim 1, wherein:

the upper locking portion is positioned on a relative top of the first container, and the lower locking portion is positioned on a relative bottom of the second container.

6. The system of claim 1, wherein:

the upper locking portion is a first upper locking portion and the lower locking portion is a second lower locking portion, the first container further comprises a first lower locking portion positioned on a relative bottom of the first container, the first lower locking portion identical to the second lower locking portion, and the second container further comprises a second upper locking portion positioned on a relative top of the second container, the second upper locking portion identical to the first upper locking portion.

7. A method for securing a first container having an upper locking portion to a second container having a lower locking portion, the method comprising:

providing the first container having the upper locking portion, the upper locking portion comprising:

a first body having a first protrusion extending laterally from the first body towards a relative center of the first container;

a first pivot structured to interface with a recess of the first container; and a first spring configured to bias the upper locking portion in a locked position;

providing the second container having the lower locking portion, the lower locking portion comprising:

a second body having a surface and a second protrusion extending along a side of the second container;

a second pivot structured to pivotably couple the second body to the second container; and a second spring configured to bias the lower locking portion in a locked position;

from a configuration in which the first container is locked to the second container by the upper locking portion and the lower locking portion and in which the first protrusion abuts the second container and restricts movement of the second container:

applying a force to the surface of the second body that causes the lower locking portion to rotate about the second pivot to an unlocked position of the lower locking portion, wherein the rotation of the lower locking portion to the unlocked position of the lower locking portion causes the second protrusion to abut the first body and cause the upper locking portion to rotate to an unlocked position of the upper locking portion, and the rotation of the upper locking portion to the unlocked position of the upper locking portion causes the first protrusion to disengage from the second container.

8. The method of claim 7, wherein the upper locking portion further comprises:

a groove positioned in a side of the first body, the groove curved about an axis of rotation defined by the first pivot; and a pin extending from the first container into the groove.

9. The method of claim 8, wherein the pin interacting with a first end of the groove defines the locked position of the upper locking portion, and the pin interacting with a second end of the groove defines the unlocked position of the upper locking portion.

10. The method of claim 7, wherein:

the upper locking portion is positioned on a relative top of the first container, and the lower locking portion is positioned on a relative bottom of the second container.

11. The method of claim 10, wherein:

the upper locking portion is a first upper locking portion and the lower locking portion is a first lower locking portion, the first container further comprises a second lower locking portion positioned on a relative bottom of the first container, the second lower locking portion identical to the first lower locking portion, and the second container further comprises a second upper locking portion positioned on a relative top of the second container, the second upper locking portion identical to the first upper locking portion.

* * * * *